(12) United States Patent
Sakai et al.

(10) Patent No.: US 9,228,752 B2
(45) Date of Patent: Jan. 5, 2016

(54) HUMIDIFIER

(75) Inventors: Takahiro Sakai, Chiyoda-ku (JP); Akira Morikawa, Chiyoda-ku (JP); Koji Ota, Chiyoda-ku (JP); Yasutaka Inanaga, Chiyoda-ku (JP); Yasuhiro Tanimura, Chiyoda-ku (JP); Hiroshi Tsutsumi, Chiyoda-ku (JP)

(73) Assignee: Mitsbuishi Electric Corporation, Tokyo (JP)

( * ) Notice: Subject to any disclaimer, the term of this patent is extended or adjusted under 35 U.S.C. 154(b) by 158 days.

(21) Appl. No.: 13/982,756

(22) PCT Filed: Aug. 20, 2012

(86) PCT No.: PCT/JP2012/070987
§ 371 (c)(1),
(2), (4) Date: Jul. 31, 2013

(87) PCT Pub. No.: WO2013/031568
PCT Pub. Date: Mar. 7, 2013

(65) Prior Publication Data
US 2013/0313729 A1    Nov. 28, 2013

(30) Foreign Application Priority Data

Aug. 29, 2011    (JP) .................................. 2011-185682

(51) Int. Cl.
| | |
|---|---|
| *F24F 6/02* | (2006.01) |
| *F24F 6/04* | (2006.01) |
| *F24F 6/12* | (2006.01) |
| *F24F 3/16* | (2006.01) |

(52) U.S. Cl.
CPC . *F24F 6/025* (2013.01); *F24F 6/04* (2013.01); *F24F 6/12* (2013.01); *F24F 3/166* (2013.01)

(58) Field of Classification Search
CPC .................................... F24F 6/02; F24F 6/025
USPC .................................. 261/30, 94, 97, 99, 116
See application file for complete search history.

(56) References Cited

U.S. PATENT DOCUMENTS 4,686,069 A * 8/1987 Hahne et al. .................... 261/92

FOREIGN PATENT DOCUMENTS

| JP | 53 32951 | 3/1978 |
|---|---|---|
| JP | 60 197263 | 10/1985 |
| JP | 2-245251 A | 10/1990 |
| JP | 3 191239 | 8/1991 |

(Continued)

OTHER PUBLICATIONS

International Search Report Issued Nov. 13, 2012 in PCT/JP12/070987 Filed Aug. 20, 2012.

(Continued)

*Primary Examiner* — Robert A Hopkins
(74) *Attorney, Agent, or Firm* — Oblon, McClelland, Maier & Neustadt, L.L.P.

(57) ABSTRACT

A humidifier includes a first electrode that is a porous metal body having a three-dimensional porous structure, a second electrode that is a conductor electrode arranged opposite to the first electrode with a space of a predetermined distance from the first electrode, a power supply that forms an electric field in the space between the first electrode and the second electrode, a water supply unit that supplies water to the first electrode, and a fan that sends air to the space to evaporate and disperse the water that is supplied from the water supply unit to the first electrode and retained by the first electrode.

14 Claims, 14 Drawing Sheets

(56) References Cited

FOREIGN PATENT DOCUMENTS

| JP | 5 94634 | 12/1993 |
|---|---|---|
| JP | 7 103522 | 4/1995 |
| JP | 2003-275291 A | 9/2003 |
| JP | 2005-192822 A | 7/2005 |
| JP | 2007 3049 | 1/2007 |
| JP | 2007-253055 A | 10/2007 |
| JP | 4089661 | 5/2008 |
| JP | 2009 14226 | 1/2009 |
| JP | 2009-125653 A | 6/2009 |
| JP | 2009 180434 | 8/2009 |
| JP | 2011 106807 | 6/2011 |
| JP | 2011 158226 | 8/2011 |

OTHER PUBLICATIONS

Office Action issued on Mar. 11, 2014 in the corresponding Japanese Patent Application No. 2013-531218 (with English Translation).
Chinese Office Action issued in Application No. 201280007897.X on May 4, 2015 (w/ English Translation).

* cited by examiner

F I G. 3
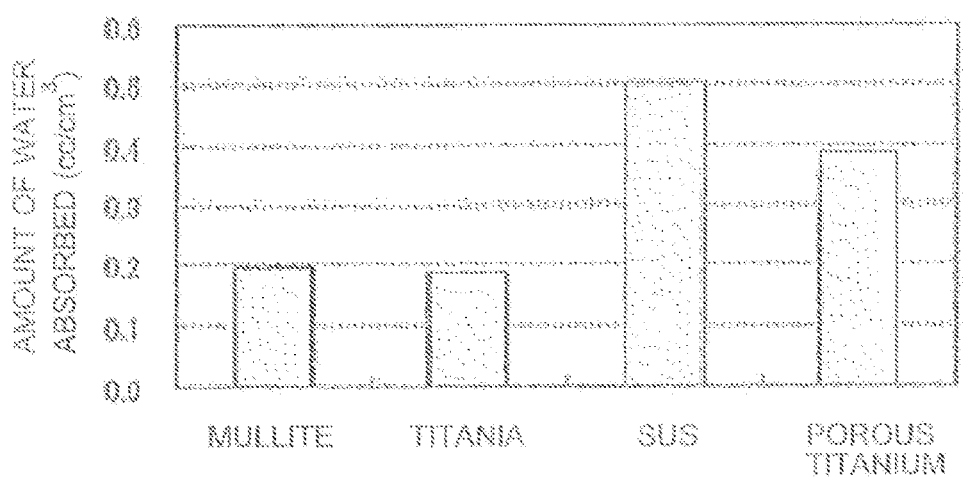
F I G. 4
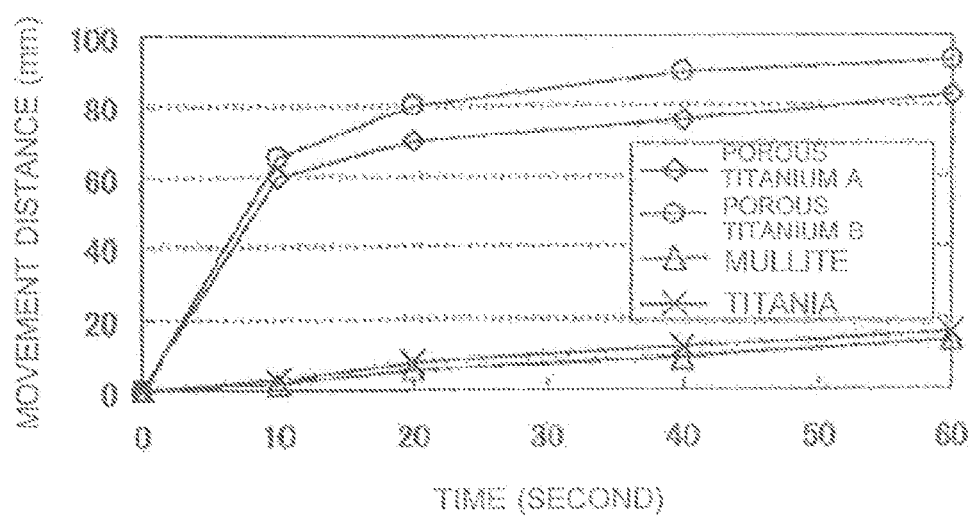

HUMIDIFIER

TECHNICAL FIELD

The present invention relates to a humidifier and a humidifying method that use a porous electrode and an electric field.

BACKGROUND ART

For specified buildings such as commercial facilities or offices with site areas of 3000 [m²] or more, it is prescribed by the Building Sanitation Control Law to keep indoor temperature at 17[° C.] to 28[° C.], and relative humidity at 40[%] to 70[%] as control standard values for the air environment. Of these, indoor temperature is controlled relatively easily with the proliferation of air-conditioners. However, it is hard to say that relative humidity is sufficiently controlled. In particular, lack of the amount of humidification in winter time has become a problem.

Conventional indoor humidification methods include evaporative, steam, and water spray methods. Among these, the evaporative method is a method of passing air through a filter having water absorption capability to cause moisture contained in the filter to exchange heat with an airstream, thereby evaporating the moisture to perform indoor humidification. The steam method is a method of energizing a heating coil placed inside a water reservoir to evaporate moisture, thereby performing indoor humidification. The water spray method is a method of atomizing moisture by pressurization, and causing the atomized moisture to exchange heat with an airstream to thereby perform indoor humidification.

As a conventional humidifier using a porous electrode, there has been disclosed a sprayer that employs, for the purpose of mist generation, a spray method using corona discharge in which an annular electrode is disposed around a position where the fluid to be sprayed is ejected, and the fluid is explosively dispersed to generate fine mist (see, for example, Patent Literature 1).

Also, an air humidifier has been disclosed in which a porous plate-like body made of sintered SiC and having a three-dimensional porous structure is arranged in an air passage in such a way that its broad surface side is oriented substantially perpendicularly, a water supply pipe is arranged in contact with the upper surface of this porous plate-like body in such a way that the entirety of an inorganic fiber layer is impregnated with water, a water receiver is provided below the porous plate-like body in such a way that a lower part of this plate-like body is beneath the surface of water, and an electrode for passing electric current through this plate-like body are attached at either side of the porous plate-like body (see, for example, Patent Literature 2).

CITATION LIST

Patent Literature

Patent Literature 1: Japanese Unexamined Patent Application Publication No. 60-197263 (pages 1 and 2, FIG. 1)
Patent Literature 2: Japanese Unexamined Utility Model Application Publication No. 05-94634 (pages 8 and 9, FIGS. 3 and 4)

SUMMARY OF INVENTION

Technical Problem

However, in the humidifier using electrical discharge in Patent Literature 1, when a corona discharge is generated between an electrode that ejects a liquid, and the annular electrode, ozone is produced from oxygen molecules in the space, and nitrogen oxide is produced from nitrogen molecules and oxygen molecules. Of these, although ozone has a very high activity and thus contributes to decomposition and inactivation of hazardous substances, bacteria, viruses, and the like, there is a problem in that ozone is highly corrosive, and the load on the human body is also a concern. Moreover, since the humidifier is configured to spray a liquid, some distance is required for the moisture sprayed into an airstream to be absorbed by the air. Further, if the space being sprayed is supersaturated, moisture is dispersed in liquid form without being vaporized, which causes discomfort to the human body, or causes malfunction of precision equipment such as electrical equipment.

The heating-type humidifier in Patent Literature 2 has a problem in that large power consumption is required to heat and evaporate water, leading to lower energy saving performance. Another problem is that a rise in the temperature of air resulting from heating and vaporization of water, combined with a factor such as high airtightness due to recent advances in architectural technology, causes the indoor temperature to rise, which increases the number of cases where a heating load is generated during cooling periods.

The present invention has been made in view of the problems mentioned above, and accordingly its object is to obtain a humidifier and a humidifying method which perform humidification of a space to be humidified, by forming an electric field between a porous metal body containing water and a conductor electrode, and increasing the area of gas-liquid contact with air sent by a fan.

Solution to Problem

A humidifier according to the present invention includes a first electrode that is a porous metal body having a three-dimensional porous structure, a second electrode that is a conductor electrode arranged opposite to the first electrode with a space of a predetermined distance from the first electrode, a power supply that forms an electric field in the space between the first electrode and the second electrode, a water supply unit that supplies water to the first electrode, and a fan that sends air to the space to evaporate and disperse the water that is supplied from the water supply unit to the first electrode and retained by the first electrode.

Advantageous Effects of Invention

According to the present invention, by forming an electric field in the space between the porous metal body and the conductor electrode by the power supply, inductively charged water is drawn from the porous metal body, thereby making it possible to increase the area of contact between this water and the air sent from the fan. Therefore, water can be efficiently evaporated and dispersed to humidify the space to be humidified. In addition, generation of heat due to electrical discharge can be prevented, and power consumption can be reduced, thereby enabling improvement of energy saving performance.

When the applied voltage is controlled to provide such an electric field strength that does not cause an electrical discharge phenomenon in the space so as to prevent electric field concentration, the space to be humidified can be humidified without generating products resulting from electrical discharge.

BRIEF DESCRIPTION OF DRAWINGS

FIG. 3 illustrates a comparison of the amounts of pure water absorbed per unit volume of the first electrode of the humidifier according to Embodiment 1 of the present invention and porous ceramics.

FIG. 4 illustrates a comparison of diffusion rates of the first electrode of the humidifier according to Embodiment 1 of the present invention and porous ceramics.

DESCRIPTION OF EMBODIMENTS

Embodiment 1.
(Configuration of Humidifier)

Figure 1:
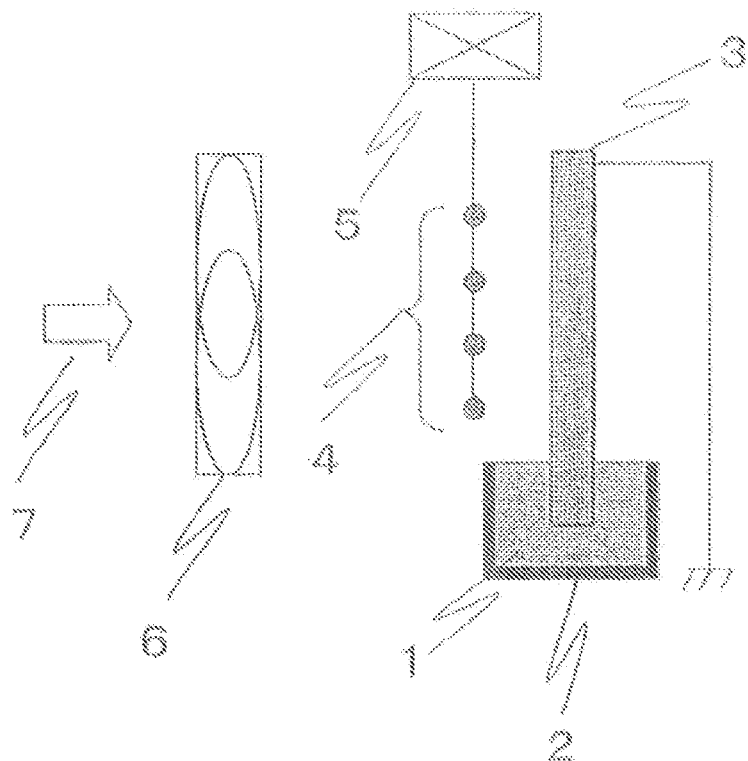
FIG. 1 is a schematic diagram of a humidifier according to Embodiment 1 of the present invention.
Figure 2:
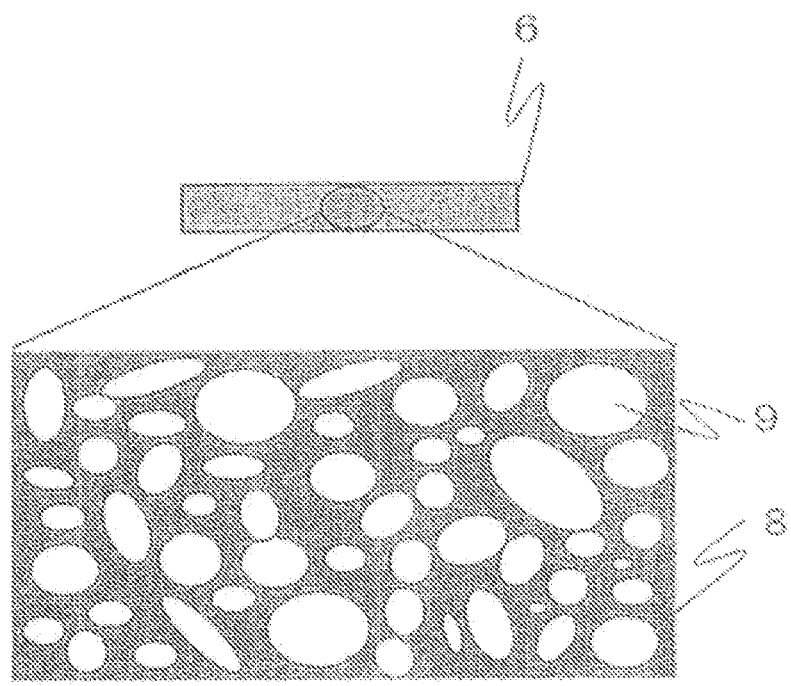
FIG. 2 is a partial enlarged cross-sectional view of a first electrode of the humidifier according to Embodiment 1 of the present invention.

FIG. 1 is a schematic diagram of a humidifier according to Embodiment 1 of the present invention, and FIG. 2 is a partial enlarged cross-sectional view of a first electrode 3 of the humidifier in FIG. 1. As illustrated in FIG. 1, the humidifier according to Embodiment 1 includes a water supply unit 2 that stores water 1, the first electrode 3 that retains the water 1 supplied from the water supply unit 2, a second electrode 4 for forming an electric field in the space (gap) between the second electrode 4 and the first electrode 3, a power supply 5 for forming an electric field in the space (gap) between the first electrode 3 and the second electrode 4, and a fan 6 that is provided in a portion upstream or downstream of a humidifying unit including the first electrode 3 and the second electrode 4. In actual use, each of the water supply unit 2, the first electrode 3, the second electrode 4, the power supply 5, and the fan 6 may be fixed in place by a predetermined support or the like. The configuration of this support is not particularly limited, and may be selected as appropriate in accordance with the intended application of the humidifier.

The water supply unit 2 stores the water 1 supplied to the first electrode 3. The water supply unit 2 supplies the water 1 to the first electrode 3, with the first electrode 3 being arranged vertically inside the water supply unit 2. While the water 1 used may be any one of pure water, tap water, soft water, and hard water for the purpose of humidifying a space to be humidified, to reduce blocking of voids 9 (described later with reference to FIG. 2) by scales, water with a low content of mineral components including calcium ion or magnesium ion is preferred. This is because if the water 1 with a high mineral content is used, solids are produced through reaction between ion components in the solution and carbon dioxide, which can block the voids 9 of the first electrode 3. Therefore, the water 1 whose ion components are removed by using a cation- and anion-exchange membrane or the like may be used.

The first electrode 3 is formed by a porous metal having a three-dimensional porous structure. In this regard, a three-dimensional porous structure is a structure similar to a resin foam such as sponge. As illustrated in FIG. 2, the first electrode 3 is formed by a metal part 8, and the voids 9 formed in the metal part 8. The first electrode 3 according to Embodiment 1 has a porosity and an average pore diameter larger than those of porous ceramics. Consequently, clogging of the voids 9 of the first electrode 3 with impurities contained in the water 1 is prevented. Since the first electrode 3 has capillary force, the water 1 can be efficiently supplied from the water supply unit 2 to the first electrode 3 by this capillary force without requiring a driving unit such as a pump.

The first electrode 3 is commonly used for applications such as a filter, a catalyst carrier, and a gas diffusion layer for fuel cell, and can be manufactured by a known method. For example, after introducing bubbles to a slurry containing metal powder as a raw material of a porous metal and a solvent, this slurry may be formed into a desired shape, and then sintered. Alternatively, after a slurry containing metal powder as a raw material of a porous metal, a binder resin that decomposes and disappears when fired at high temperatures, and a solvent is formed into a desired shape, the slurry may be degreased and sintered.

The metal species forming the first electrode 3 is not particularly limited. Examples of the metal species include a metal such as titanium, copper, or nickel, a noble metal such as gold, silver, or platinum, and an alloy such as a nickel alloy or cobalt alloy. These metal species may be used alone or in combination of two or more thereof. Among these, titanium is the most preferred metal species because titanium prevents generation of products from electrical discharge such as ozone owing to its catalytic effect, has good resistance to electrical corrosion and electrical wear, and further retains the shape of the first electrode 3 over an extended period of time to allow stable humidification. The solvent used for manufacture of a porous metal is not particularly limited and may be, for example, water. The binder resin used for manufacture of a porous metal is not particularly limited and may be acrylic resin, epoxy resin, polyester resin, or the like. The sintering temperature is not particularly limited, either, and may be adjusted as appropriate in accordance with the material to be used.

The surface layer of the first electrode 3 may be subjected to hydrophilic treatment for the viewpoints of increasing the amount of retention of water 1, and preventing degradation of water absorption performance. The kind of the method for the hydrophilic treatment is not particularly limited. For example, hydrophilic treatment by coating with hydrophilic resin, or hydrophilic treatment by corona discharge may be performed.

The shape of the first electrode 3 is also not particularly limited and may be, for example, a flat shape, a square pole shape, or a cylindrical shape. As will be described later, a shape that allows the water 1 to be efficiently drawn by the electric field in the space between the first electrode 3 and the second electrode 4 may be selected. In this case, as a method of forming the first electrode 3 into a desired shape, the first electrode 3 may be machined into a desired shape by, for example, preparing a sheet-like porous metal with a thickness of not less than 0.5 [mm] and not more than 2 [mm], and then cutting the sheet-like porous metal into a desired shape. The machining method is also not particularly limited, and may be performed by various methods such as wire-cutting, laser-cutting, press-cutting, shaving, manual cutting, or bending. The size of the first electrode 3 is not particularly limited, either, and may be adjusted as appropriate in accordance with the size of the humidifier to be manufactured.

The second electrode 4 is formed by a conductor electrode arranged opposite to the first electrode 3 at a predetermined distance therefrom. The second electrode 4 is required to have electrical conductivity in order to form an electric field in the space between the second electrode 4 and the first electrode 3, and as its material, for example, a metal, a metal alloy, or a conductive resin is preferred. It suffices that the second electrode 4 has low electrical resistance, and is preferably made of, but not limited to, aluminum, copper, stainless steel, or the like from the viewpoints of general usability and ease of machining. The size of the second electrode 4 is not particularly limited, either, and may be adjusted as appropriate in accordance with the size of the humidifier to be manufactured.

The gap length of the space between the first electrode 3 and the second electrode 4 is desirably not less than 3 [mm] and not more than 20 [mm]. This is because if the gap length is less than 3 [mm], the pressure loss of air sent by the fan 6 becomes large owing to the narrow space between the first electrode 3 and the second electrode 4, resulting in high power load on the fan 6, whereas if the gap length is larger than 20 [mm], a sufficient electric field strength for drawing the water 1 from the first electrode 3 is not reached, resulting in a decrease in humidification capacity.

The power supply 5 outputs a voltage for forming an electric field between the first electrode 3 and the second electrode 4. The power supply 5 is connected to the second electrode 4, and the first electrode 3 is a ground electrode that is electrically grounded. When the power supply 5 applies voltage to the second electrode 4, an electric field is formed in the space between the first electrode 3 and the second electrode 4. At this time, to perform humidification from the first electrode 3, it is desirable to ground the first electrode 3 and apply a DC negative polarity voltage to the second electrode 4 located opposite to the first electrode 3, or apply a DC positive polarity voltage to the first electrode 3 and ground the second electrode 4 located opposite to the first electrode 3. Consequently, in a case where a DC positive polarity voltage is applied to the first electrode 3 containing the water 1, it is possible to prevent degradation of the first electrode 3 due to electrical corrosion. Further, the humidifier has a power supply control unit 15 that adjusts the strength of the electric field between the first electrode 3 and the second electrode 4 formed by the power supply 5 in order to adjust the amount of humidification. The power supply control unit 15 controls the voltage outputted from the power supply 5.

In a case where a DC negative polarity voltage is applied as a voltage value applied to the second electrode 4 by the power supply 5, it is desirable to apply a voltage of not less than −10 [kV] and not more than −4 [kV]. This is because when the applied voltage is larger than −4 [kV] and less than 0 [kV], the strength of the electric field formed between the first electrode 3 and the second electrode 4 is weak, which makes it impossible to draw the water 1 from the first electrode 3, whereas when the applied voltage is smaller than −10 [kV] (that is, when the absolute value of the applied voltage is larger than 10 [kV]), the load on the power supply 5 becomes large, which makes insulation design difficult. Moreover, it is desirable to set the strength of the electric field formed between the first electrode 3 and the second electrode 4 to not more than 30 [kV/cm] which is the breakdown electric field strength of gas, in order that electrical discharge does not occur in the humidifier. This is because when an electric field of 30 [kV/cm] is formed between the first electrode 3 and the second electrode 4 by the power supply 5, a spark discharge occurs between the first electrode 3 and the second electrode 4, which reduces the lifetime of the first electrode 3, and increases ineffective power consumption due to heat generation.

(Porosity of First Electrode 3)

FIG. 3 illustrates a comparison of the amounts of pure water absorbed per unit volume of the first electrode 3 of the humidifier according to Embodiment 1 of the present invention and porous ceramics. Hereinafter, the porosity of the first electrode 3 will be described with reference to FIGS. 2 and 3. As mentioned above, while the metal species of the first electrode 3 does not matter as long as the metal species is a porous metal having a three-dimensional porous structure, it is preferable to use a porous metal with high porosity. In this regard, porosity represents percentage of voids, and represents the ratio of the voids 9 with respect to the total volume of the first electrode 3. The higher the porosity, the greater the amount of the water 1 from the water supply unit 2 that can be contained in the first electrode 3. The first electrode 3 has a high water-containing capacity if the first electrode 3 has a very high porosity of about 70[%] to 95[%] owing to the three-dimensional porous structure. Specifically, FIG. 3 illustrates the results in a case where porous titanium (average porosity: 90[%]) and SUS 316L (average porosity: [82%]) are used as the first electrode 3, and titania (average porosity: 31 [%]) and mullite (average porosity: 34[%]) are used as porous ceramics.

As is apparent from FIG. 3, the amounts of water absorbed per unit volume of titania and mullite that are porous ceramics are small at 0.17 [cc/cm$^3$] and 0.19 [cc/cm$^3$], respectively, whereas the amounts of water absorbed per unit volume of porous titanium and SU 316L are large at 0.38 [cc/cm$^3$] and 0.5 [cc/cm$^3$], respectively. That is, it is appreciated that the water absorption performance increases as the average porosity becoporousigher. Therefore, by using porous titanium or a SUS (stainless) material such as SUS 316L, 304, or 316 as the first electrode 3, it is possible to retain a large amount of the water 1 supplied from the water supply unit 2. Because the voids 9 increase with increase in porosity, by taking the mechanical strength of the first electrode 3 into consideration, the porosity of the first electrode 3 is desirably 60[%] to 90[%]. This is because a porosity higher than 90[%] results in low strength, whereas a porosity less than 60[%] causes a decrease in the amount of absorption, which makes it impossible to obtain a sufficient amount of humidification.

(Pore Diameter of First Electrode 3)

It is preferable to use a porous metal with a large pore diameter as the first electrode 3 of the humidifier. In this regard, pore diameter is defined as the average value of the pore diameters of the voids 9 in the porous metal. Specifically, for the first electrode 3, for example, the pore diameter of the porous metal is set to 50 [μm] to 600 [μm]. This is because a pore diameter less than 50 [μm] can cause clogging of the voids 9 with impurities owing to the small pore diameter, whereas a pore diameter larger than 600 [μm] makes the first electrode 3 weak in terms of mechanical strength. Therefore, the pore diameter of the first electrode 3 is preferably set to 50 [μm] to 600 [μm]. If the pore diameter falls within this range, there is no problem in terms of the strength of the first electrode 3, and clogging of the voids 9 with impurities can be prevented.

(Diffusion Rate of First Electrode 3)

Further, it is preferable to use a porous metal with a high diffusion rate as the first electrode 3 of the humidifier. FIG. 4 illustrates a comparison of diffusion rates of porous metal bodies used as the first electrode 3 of the humidifier and porous ceramics. Hereinafter, the diffusion rate of the first electrode 3 will be described with reference to FIGS. 2 and 4. In this regard, diffusion rate represents the rate at which the water 1 supplied diffuses inside a substance having pores. It is perceived that in the humidifier according to Embodiment 1, in a case where the diffusion rate of the first electrode 3 is lower than the rate of humidification by the supplied water 1 due to the electric field, the diffusion rate of the first electrode 3 becomes a rate-limiting factor and limits the amount of humidification. For this reason, it is necessary to use a porous metal body with a high diffusion rate as the first electrode 3. In this regard, a comparison of diffusion rate between the first electrode 3 according to Embodiment 1 and porous ceramics is illustrated as in FIG. 4. Specifically, FIG. 4 illustrates the measurements of the distance moved by pure water at predetermined intervals of time, when porous titanium A (porosity: 86.4[%], pore diameter: 50 [μm]) and porous titanium B (porosity: 81.2[%], pore diameter: 30 [μm]) are used as the first electrode 3, titania (porosity: 31[%], pore diameter: 0.4 [μm]) and mullite (porosity: 34[%], pore diameter: 0.3 [μm]) are used as porous ceramics, and 1 [cc] of pure water is supplied to one end with a syringe. The measurement samples of the first electrode 3 and porous ceramics are round bar-shaped with a diameter of 5 mm and a length of 10 cm.

As is apparent from FIG. 4, the distances moved by pure water in titania and mullite that are porous ceramics are short at less than 20 [mm] even after elapse of 60 [seconds], whereas the distances moved by pure water in the porous titanium A and the porous titanium B are long at 80 [mm] to 90 [mm] after elapse of 60 [seconds]. That is, it is appreciated that the porous titanium A and the porous titanium B with large porosities and pore diameters have high diffusion rates in comparison to porous ceramics. Therefore, by using the porous titanium A or porous titanium B as the first electrode 3, the diffusion rate can be made faster than in porous ceramics, which means that the diffusion rate is less likely to become a rate-limiting condition for the humidification rate. Moreover, the propulsion force ΔP of a liquid within the first electrode 3 according to Embodiment 1 is uniquely determined by a surface tension σ, a contact angle α, a pore diameter D, and a constant Kc, and is thus not dependent on the metal species forming the first electrode 3. As represented by Equation (1) below, in order to achieve improved propulsion force ΔP, that is, higher diffusion rate, hydrophilic treatment for making the contact angle α smaller, and selection of a smaller pore diameter D are required.

[Mathematical Expression 1]

$$\Delta P = Kc \frac{\sigma \cos\alpha}{D} \quad (1)$$

(Operation of Humidifier)

Next, operation of the humidifier according to Embodiment 1 will be described with reference to FIG. 1. The water 1 is supplied to the first electrode 3 by a capillary phenomenon from the water supply unit 2 in which the water 1 such as tap water is stored. Since the first electrode 3 that is a porous metal having a three-dimensional porous structure has capillary force, the water 1 is uniformly diffused across the entire first electrode 3 through the voids 9 of the first electrode 3, and a predetermined amount of the water 1 is retained by the first electrode 3. At this time, when the power supply 5 applies voltage to the second electrode 4 that is provided opposite to the first electrode 3 at a predetermined distance therefrom, an electric field is formed between the first electrode 3 that is a ground electrode and the second electrode 4, causing electric charges to move to the vicinity of the surface of the first electrode 3. The electric charges that have moved cause the water 1 existing in the voids 9 of the first electrode 3 to be inductively charged, and the Coulomb force exerted by the electric field causes the inductively charged water 1 to form a Taylor cone having a triangular pyramid shape in a direction toward the second electrode 4. The equilibrium between the Coulomb force received by the inductively charged water 1 from the electric field and the surface tension causes this Taylor cone to keep its triangular pyramid shape.

At this time, the power supply 5 forms such an electric field that does not cause an electrical discharge phenomenon to occur between the first electrode 3 and the second electrode 4. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4 by the power supply 5, and the Coulomb force overcomes the surface tension of the water 1 forming the Taylor cone, the Taylor cone drawn from the first electrode 3 is released into the space in the form of mist, causing the Taylor cone to break up into fine droplets of several tens [nm] in size through Rayleigh fission. However, in Embodiment 1, by controlling the strength of the electric field between the porous metal body 3 and the conductor electrode 4 by the power supply 5 so that an electrical discharge phenomenon does not occur, the water 1 on the surface of the porous metal body 3 is kept in the Taylor cone state.

As air is sent from the fan 6 provided upstream or downstream of the humidifying unit including the first electrode 3 and the second electrode 4, the water 1 on the surface layer of the first electrode 3, and the Taylor cone drawn from the first electrode 3 by the electric field evaporate and disperse upon gas-liquid contact with gas to be treated 7 that is the air sent by the fan 6, thereby humidifying the space to be humidified. While the gas to be treated 7 is sent by the fan 6 in the same direction as the direction of the electric field in FIG. 1, this direction is preferably perpendicular to the direction of the electric field formed in the space between the first electrode 3 and the second electrode 4. Moreover, by adjusting the strength of the electric field between the first electrode 3 and the second electrode 4 by the power supply control unit 15, the size of the Taylor cone is varied to adjust the contact area with the gas to be treated 7, thereby enabling control of the amount of humidification.

(Advantageous Effects of Embodiment 1)

In accordance with the configuration and operation as described above, in the humidifier according to Embodiment 1, an electric field is formed in the space between the first electrode 3 and the second electrode 4 by the power supply 5. At this time, the strength of the electric field is controlled so that an electrical discharge phenomenon does not occur in the space, thereby making it possible to humidify the space to be humidified without generating products resulting from electrical discharge. Moreover, heat generation due to electrical discharge can be prevented, and power consumption can be reduced, thereby enabling improvement of energy saving performance.

That is, humidifiers using electrical discharge have a problem in that ozone or nitrogen oxide is generated from oxygen molecules in the space. In particular, $NO_2$ that is nitrogen oxide affects the respiratory systems of the human body, and thus its emission is restricted by the Air Pollution Control Law of Japan as follows: "Daily average concentration shall be within a range of 0.04 [ppm] to 0.06 [ppm] or below". While in the humidifier according to Embodiment 1 an electric field is formed between the first electrode 3 and the second electrode 4 by the power supply 5, the strength of the electric field is controlled so that an electrical discharge phenomenon does not occur in the space, thereby making it possible to humidify the space to be humidified without generating products resulting from electrical discharge. Further, heat generation due to electrical discharge can be prevented, and power consumption can be reduced, thereby enabling improvement of energy saving performance.

In the case of humidifiers that evaporate water by heating, there is a problem in that the energy for generating heat is required, and the room temperature rises with heat generation. According to the humidifier mentioned above, heat generation can be prevented, and power consumption can be reduced, thereby enabling improvement of energy saving performance.

By forming an electric field between the first electrode 3 and the second electrode 4 by the power supply 5, and drawing inductively charged water 1 from the first electrode 3 as a Taylor cone, the contact area between the water 1 and the gas to be treated 7 sent from the fan 6 can be increased. Therefore, the water 1 can be efficiently evaporated and dispersed to humidify the space to be humidified. In particular, because the size of the Taylor cone can be controlled by adjusting the strength of the electric field by the voltage control unit 15, the size of the gas-liquid contact area can be adjusted. Therefore, the amount of humidification can be adjusted even in the case of a gas-liquid contact type of evaporative humidifier. That is, the problem with a typical gas-liquid contact type of evaporative humidifier using only a filter and a fan is that the amount of humidification is uniquely determined by air velocity, the surface area of the filter, temperature, and the like, and when it is desired to control the amount of humidification, there are no other ways but to adjust the amount of air. According to the embodiment mentioned above, by adjusting the electric field strength, the size of the Taylor cone is varied to thereby adjust the gas-liquid contact area. Therefore, it is possible to adjust the amount of humidification even in the case of a gas-liquid contact type of evaporative humidifier.

By forming the first electrode 3 by titanium, generation of products resulting from electrical discharge such as ozone can be prevented by its catalytic effect, resistance to electrical corrosion and electrical wear is improved, and further, the shape of the first electrode 3 can be retained for an extended period of time to allow stable humidification.

By grounding the first electrode 3, and applying a DC negative polarity voltage to the second voltage 4 located opposite to the first electrode 3, degradation of the first electrode 3 due to electrical corrosion can be prevented.

In a case where a DC negative polarity voltage is applied as a voltage value applied to the second electrode 4 by the power supply 5, by applying a voltage of not less than −10 [kV] and not more than −4 [kV], the water 1 can be drawn from the first electrode 3 by the electric field formed between the first electrode 3 and the second electrode 4, and further, the load on the power supply 5 is reduced, thereby facilitating insulation design.

By setting the strength of the electric field formed between the first electrode 3 and the second electrode 4 to not more than 30 [kV/cm] which is the breakdown electric field strength of gas, occurrence of a spark discharge between the first electrode 3 and the second electrode 4 can be prevented, the lifetime of the first electrode 3 can be extended, and heat generation due to electrical discharge can be prevented to thereby reduce power consumption.

By setting the gap length of the space between the first electrode 3 and the second electrode 4 to not less than 3 [mm] and not more than 20 [mm], pressure loss of the air sent by the fan 6 can be prevented to reduce the power load on the fan 6, and further, a sufficient electric field strength for drawing the water 1 from the first electrode 3 can be ensured, thereby reducing decrease in humidification capacity.

By forming the first electrode 3 by porous titanium or a SUS material such as SUS 316L, 304, or 316, and setting its porosity to 60[%] to 90[%], it is possible to ensure a sufficient amount of water wicked by the first electrode 3, and also maintain appropriate strength of the first electrode 3.

By setting the pore diameter of the first electrode to 50 [µm] to 600 [µm], it is possible to maintain the strength of the first electrode 3, and prevent clogging of the voids 9 with impurities.

Further, by forming the first electrode 3 by porous titanium, the diffusion rate can be made higher than that of porous ceramics, with the result that the diffusion rate does not become a rate-limiting condition for the humidification rate.

Embodiment 2.

Figure 5:
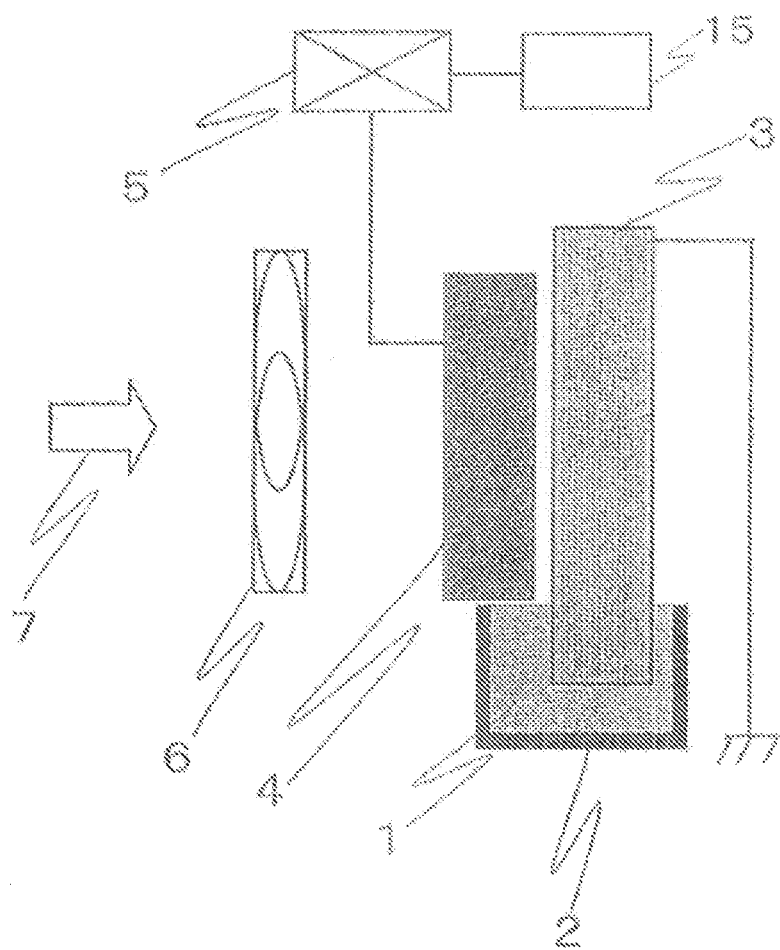
FIG. 5 is a schematic diagram of a humidifier according to Embodiment 2 of the present invention.

FIG. 5 is a schematic diagram illustrating Embodiment 2 of a humidifier according to the present invention. The humidifier will be described with reference to FIG. 5. The portions of the humidifier in FIG. 5 which are configured in the same manner as in the humidifier in FIG. 1 are denoted by the same reference numerals and a description thereof is omitted. The humidifier in FIG. 5 differs from the humidifier in FIG. 1 in the configuration of the second electrode.

(Configuration of Humidifier)

As illustrated in FIG. 5, the first electrode 3 and the second electrode 4 of the humidifier according to Embodiment 2 are flat-shaped, and are arranged opposite to each other so that their planes are parallel to each other. Drawing of the water 1 from the first electrode 3 due to the electric field in the space between the first electrode 3 and the second electrode 4 takes place in a location where the greatest electrical strength is exerted. For this reason, if the electric field is non-uniform, drawing of the water 1 becomes sparse, which makes it impossible for the humidifier to perform humidification efficiently. Accordingly, however, as illustrated in FIG. 5, by forming the first electrode 3 and the second electrode 4 in a flat shape, and arranging these electrodes with their planes being opposite to each other, the area over which an electric field is formed is increased, and a uniform electric field is formed in the space between the first electrode 3 and the second electrode 4. As a result, the water 1 can be efficiently drawn from the first electrode 3.

(Operation of Humidifier)

Next, operation of the humidifier according to Embodiment 2 will be described with reference to FIG. 5. The water 1 is supplied to the first electrode 3 from the water supply unit 2 in which the water 1 such as tap water is stored. Since the first electrode 3 has capillary force, the water 1 is uniformly diffused across the entire first electrode 3 through the voids 9 of the first electrode 3, and a predetermined amount of the water 1 is retained by the first electrode 3. At this time, when the power supply 5 applies voltage to the second electrode 4 having a flat shape that is provided opposite to the first electrode 3 having a flat shape at a predetermined distance, a uniform electric field is formed between the first electrode 3 and the second electrode 4, causing electric charges to move to the vicinity of the surface of the first electrode 3. The electric charges that have moved cause the water 1 existing in the voids 9 of the first electrode 3 to be inductively charged, and the Coulomb force exerted by the electric field causes the inductively charged water 1 to form a Taylor cone having a triangular pyramid shape in a direction toward the second electrode 4. The equilibrium between the Coulomb force received by the inductively charged water 1 from the electric field and the surface tension causes this Taylor cone to keep its triangular pyramid shape.

At this time, the power supply 5 forms such an electric field that does not cause an electrical discharge phenomenon to occur between the first electrode 3 and the second electrode 4. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4 by the power supply 5, and the Coulomb force overcomes the surface tension of the water 1 forming the Taylor cone, the Taylor cone drawn from the first electrode 3 is released into the space in the form of mist, causing the Taylor cone to break up into fine droplets of several tens [nm] in size through Rayleigh fission. However, in Embodiment 2, by controlling the strength of the electric field between the porous metal body 3 and the conductor electrode 4 by the power supply 5 so that an electrical discharge phenomenon does not occur, the water 1 on the surface of the porous metal body 3 is kept in the Taylor cone state.

As air is sent from the fan 6 provided upstream or downstream of the humidifying unit including the first electrode 3 and the second electrode 4, the water 1 on the surface layer of the first electrode 3, and the Taylor cone drawn from the first electrode 3 by the electric field evaporate and disperse upon gas-liquid contact with the gas to be treated 7 that is the air sent by the fan 6, thereby humidifying the space to be humidified. The direction in which the gas to be treated 7 is sent by the fan 6 is preferably perpendicular to the direction of the electric field formed in the space between the porous metal body 3 having a flat shape and the conductor electrode 4 having a flat shape. Moreover, by adjusting the strength of the electric field between the first electrode 3 and the second electrode 4 by the power supply control unit 15, the size of the Taylor cone is varied to adjust the contact area with the gas to be treated 7, thereby enabling control of the amount of humidification.

(Humidification Performance of Humidifier)

Figure 6:
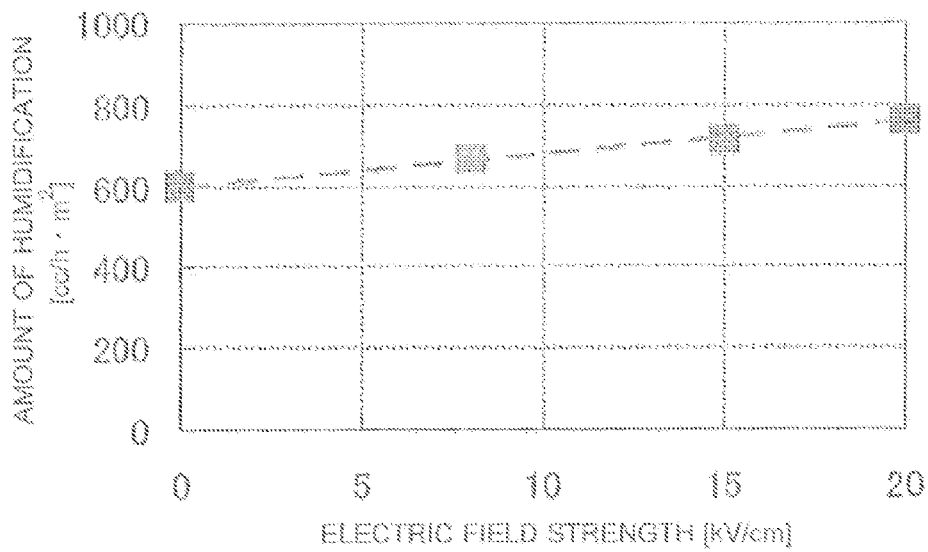
FIG. 6 illustrates the relationship between electric field strength and amount of humidification in the humidifier according to Embodiment 2 of the present invention.

FIG. 6 illustrates the relationship between electric field strength and amount of humidification in the humidifier according to Embodiment 2 of the present invention. The humidifier according to Embodiment 2 performs humidification by forming a uniform electric field between the first electrode 3 and the second electrode 4, and allows the amount of humidification to be controlled by adjusting the strength of the electric field. In this regard, FIG. 6 illustrates humidification performance with respect to electric field strength in a case where the first electrode 3 containing the water 1 supplied from the water supply unit 2 in which the water 1 is stored is grounded, and voltage is applied by the power supply 5 to the second electrode 4 arranged opposite to the first electrode 3. FIG. 6 illustrates a case where air is sent at 1 [m/s] by the fan 6 to the space between the first electrode 3 and the second electrode 4, and the humidification performance is represented as the amount of humidification per unit area of the first electrode 3 and per unit time. As is apparent from FIG. 6, as the electric field strength increases, the amount of humidification per unit area and per unit time also improves. That is, by increasing the strength of the electric field between the first electrode 3 and the second electrode 4 by the power supply 5, formation of a Taylor cone is promoted. Therefore, the contact area with the gas to be treated 7 increases, thereby making it possible to increase humidification performance. Moreover, the humidifier according to Embodiment 2 can control humidification performance by adjusting the electric field strength, thereby enabling control of the amount of humidification required for the space to be humidified, irrespective of the outside air environment.

(Advantageous Effects of Embodiment 2)

As in the configuration described above, by forming the first electrode 3 and the second electrode 4 in a flat shape, and arrange these electrodes with their planes being opposite to each other, the area over which an electric field is formed can be increased, and a uniform electric field can be formed in the space between the first electrode 3 and the second electrode 4. Therefore, the water 1 can be efficiently drawn from the first electrode 3.

Figure 7:
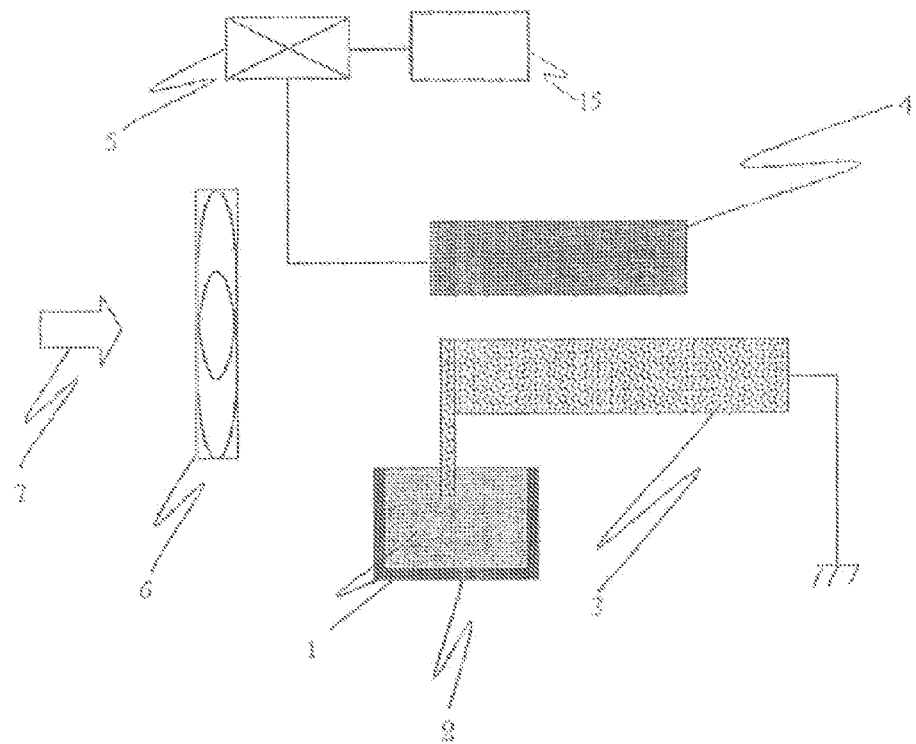
FIG. 7 is an example of schematic diagram of the humidifier according to Embodiment 2 of the present invention.

While FIG. 6 illustrates a case where the opposing surfaces of the first electrode 3 and second electrode 4 are formed in the vertical direction by way of example, the opposing surfaces of the first electrode 3 and second electrode 4 may be formed in a direction perpendicular to the direction of gravity as illustrated in FIG. 7. While FIG. 7 illustrates a case where the first electrode 3 is located on the upper side and the second electrode 4 is located on the lower side by way of example, the first electrode 3 may be located on the lower side and the second electrode 4 may be located on the upper side.

As illustrated in FIG. 7, by making the direction in which the gas to be treated 7 is sent by the fan 6 perpendicular to the direction of an electric field formed between the first electrode 3 and the second electrode 4 that have a flat shape, the contact area between a Taylor cone drawn from the first electrode 3 by a uniform electric field and the gas to be treated 7 increases, thereby enabling improvement of humidification performance.

Moreover, the humidifier according to Embodiment 2 can control humidification performance by adjusting the strength of the uniform electric field, thereby enabling control of the amount of humidification required for the space to be humidified, irrespective of the outside air environment.

Embodiment 3.

Figure 8:
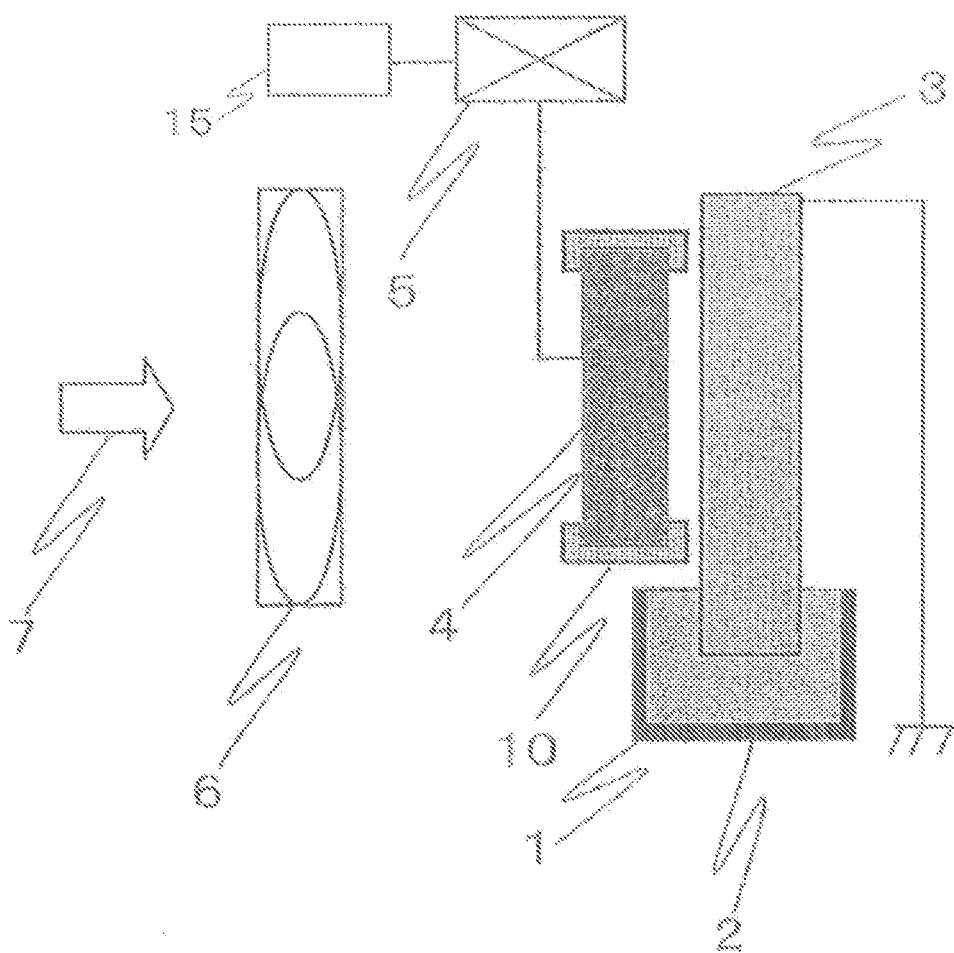
FIG. 8 is a schematic diagram of a humidifier according to Embodiment 3 of the present invention.

FIG. 8 is a schematic diagram illustrating Embodiment 3 of a humidifier according to the present invention. The humidifier will be described with reference to FIG. 8. The portions of the humidifier in FIG. 8 which are configured in the same manner as in the humidifier in FIG. 5 are denoted by the same reference numerals and a description thereof is omitted. The humidifier in FIG. 8 differs from the humidifier in FIG. 5 in that the second electrode has an insulating member.

(Configuration of Humidifier)

As illustrated in FIG. 8, the second electrode 4 of the humidifier according to Embodiment 3 which has a flat shape has an insulating member 10 provided at its outer peripheral end portion. When an electric field is formed between the first electrode 3 having a planar structure and the second electrode 4 having a planar structure, abnormal electrical discharge occurs from the respective end portions of the first electrode 3 and second electrode 4 in some cases. Because a uniform electric field cannot be formed between the first electrode 3 and the second electrode 4 in that case, it is necessary to prevent occurrence of abnormal electrical discharge from the first electrode 3 and the second electrode 4. Accordingly, as in Embodiment 3, by providing the insulating member 10 at an outer peripheral end portion of the second electrode 4, occurrence of abnormal electrical discharge from the first electrode 3 and the second electrode 4 can be prevented.

The insulating member 10 is provided at an outer peripheral end portion of the second electrode 4, and prevents abnormal electrical discharge from the first electrode 3 and the second electrode 4. The insulating member 10 is preferably made of a material with high electrical insulating property, for example, plastic such as polyethylene, polypropylene, or polyvinyl chloride, ceramic such as alumina or mullite, or glass. The material is not particularly limited but may be selected as appropriate in accordance with the intended application. The thickness of the insulating member 10 may be selected as appropriate so that the space between the first electrode 3 and the second electrode 4 is not blocked.

(Advantageous Effects of Embodiment 3)

By providing the insulating member 10 at an outer peripheral end portion of the second electrode 4 as in the configuration mentioned above, a uniform electric field can be formed in the space between the first electrode 3 and the second electrode 4 with greater reliability, allowing the water 1 to be uniformly and efficiently drawn from the first electrode 3.

Moreover, occurrence of abnormal electrical discharge from the respective end portions of the first electrode 3 and second electrode 4 can be prevented, thereby enabling improvement of the humidification performance of the humidifier.

Embodiment 4.

Figure 9:
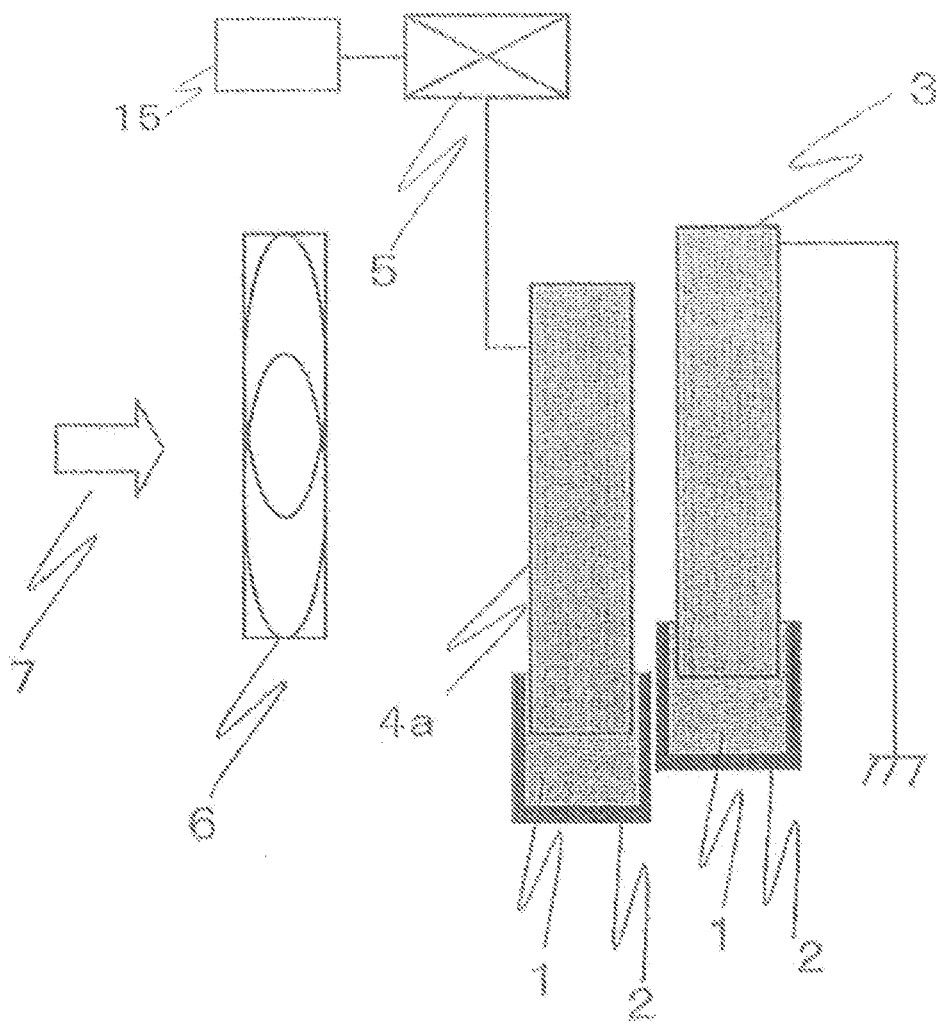
FIG. 9 is a schematic diagram of a humidifier according to Embodiment 4 of the present invention.

FIG. 9 is a schematic diagram illustrating Embodiment 4 of a humidifier according to the present invention. The humidifier will be described with reference to FIG. 9. The portions of the humidifier in FIG. 9 which are configured in the same manner as in the humidifier in FIG. 1 are denoted by the same reference numerals and a description thereof is omitted. The humidifier in FIG. 9 differs from the humidifier in FIG. 1 in the configuration of the second electrode.

(Configuration of Humidifier)

As illustrated in FIG. 9, in the humidifier according to Embodiment 4, like the first electrode 3, a second electrode 4a is formed by a porous metal having a three-dimensional porous structure. Further, the second electrode 4 is arranged vertically inside the water supply unit 2 in which the water 1 is stored, and the water 1 is supplied by the water supply unit 2. While the material and structure of the second electrode 4a are desirably similar to the first electrode 3, it suffices as long as the second electrode 4a has the same function as the first electrode 3. The second electrode 4a is connected with the power supply 5, and voltage is applied to the second electrode 4a. That is, both of the first electrode 3 and the second electrode 4a serving as electrodes are supplied with the water 1 from the corresponding water supply units 2, 2, and a Taylor cone is formed in both of the first electrode 3 and the second electrode 4a by an electric field formed by the power supply 5. Therefore, the humidification performance of the humidifier can be improved.

As in the humidifier according to Embodiment 2, the first electrode 3 and the first electrode 4a may be formed in a flat shape. Consequently, a uniform electric field can be formed in the space between the first electrode 3 and the second electrode 4a, allowing the water 1 to be uniformly and efficiently drawn from the first electrode 3 and the second electrode 4a.

(Operation of Humidifier)

Next, operation of the humidifier according to Embodiment 2 will be described with reference to FIG. 9. The water 1 is supplied to the first electrode 3 from the water supply unit 2 in which the water 1 such as tap water is stored. Likewise, the water 1 is supplied to the second electrode 4a from the water supply units 2, 2 in which the water 1 is stored. Since the first electrode 3 and the second electrode 4a have capillary force, the water 1 is uniformly diffused across the entire first electrode 3 through the voids 9 of the first electrode 3, and a predetermined amount of the water 1 is retained by the first electrode 3 and the second electrode 4a. At this time, when the power supply 5 applies voltage to the second electrode 4a that is provided opposite to the first electrode 3 at a predetermined distance, an electric field is formed between the first electrode 3 that is a ground electrode and the second electrode 4a, and electric charges move to the vicinity of the surfaces of the first electrode 3 and second electrode 4a. The electric charges that have moved cause the water 1 existing in the voids 9 of the first electrode 3 and second electrode 4a to be inductively charged, and the Coulomb force exerted by the electric field causes the inductively charged water 1 to form a Taylor cone having a triangular pyramid shape. The equilibrium between the Coulomb force received by the inductively charged water 1 from the electric field and the surface tension causes this Taylor cone to keep its triangular pyramid shape.

At this time, the power supply 5 controls the strength of the electric field between the first electrode 3 and the second electrode 4 so that an electrical discharge phenomenon does not occur. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4a by the power supply 5, and the Coulomb force overcomes the surface tension of the water 1 forming the Taylor cone, the Taylor cone drawn from the first electrode 3 and the second electrode 4a is released into the space in the form of mist, causing the Taylor cone to break up into fine droplets of several tens [nm] in size through Rayleigh fission. However, in Embodiment 4, by controlling the strength of the electric field between the first electrode 3 and the second electrode 4a by the power supply 5 so that an electrical discharge phenomenon does not occur, the surfaces of the first electrode 3 and second electrode 4a are kept in the Taylor cone state.

As air is sent from the fan 6 provided upstream or downstream of the humidifying unit including the first electrode 3 and the second electrode 4a, the water 1 on the surface layers of the first electrode 3 and second electrode 4a, and the Taylor cone drawn from the first electrode 3 and the second electrode 4a by the electric field evaporate and disperse upon gas-liquid contact with the gas to be treated 7 that is the air sent by the fan 6, thereby humidifying the space to be humidified. Since the Taylor cone is formed from both of the first electrode 3 and the second electrode 4a in FIG. 9, the contact area with the gas to be treated 7 further increases, thereby enabling further improvement of humidification performance. Moreover, by adjusting the strength of the electric field between the first electrode 3 and the second electrode 4a by the power supply control unit 15, the size of the Taylor cone is varied to adjust the contact area with the gas to be treated 7, thereby enabling control of the amount of humidification.

(Advantageous Effects of Embodiment 4)

As in the configuration described above, both of the first electrode 3 and the second electrode 4a serving as electrodes are supplied with the water 1 from the corresponding water supply units 2, 2, and a Taylor cone is formed in both of the first electrode 3 and the second electrode 4a by an electric field formed by the power supply 5. Therefore, the contact area with the gas to be treated 7 further increases, thereby enabling further improvement of humidification performance.

While the water supply unit 2 that supplies water to the first electrode 3, and the water supply unit 2 that supplies water to the second electrode 4a are formed separately, this should not be construed restrictively. Water may be supplied to the first electrode 3 and the second electrode 4a by a common water supply unit 2.

Embodiment 5.

Figure 10:
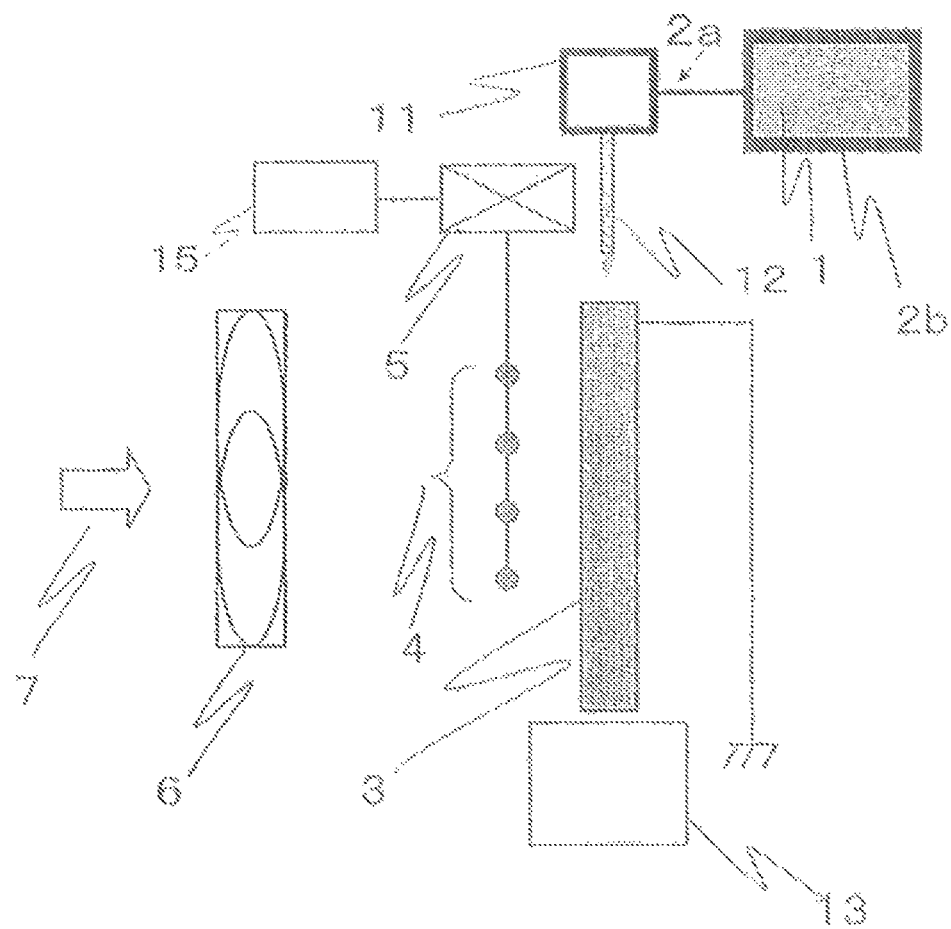
FIG. 10 is a schematic diagram of a humidifier according to Embodiment 5 of the present invention.

FIG. 10 is a schematic diagram illustrating Embodiment 5 of a humidifier according to the present invention. The humidifier will be described with reference to FIG. 10. The portions of the humidifier in FIG. 10 which are configured in the same manner as in the humidifier in FIG. 1 are denoted by the same reference numerals and a description thereof is omitted. The humidifier in FIG. 10 differs from the humidifier in FIG. 1 in that a water supply unit supplies the water 1 to the first electrode 3 from above.

(Configuration of Humidifier)

As illustrated in FIG. 10, in the humidifier according to Embodiment 5, a water supply unit 2a includes a water storage unit 2b, a pressure drive unit 11, a nozzle 12, and a drain pan 13. The water storage unit 2b stores the water 1, and feeds the water 1 to the pressure drive unit 11. The pressure drive unit 11 transfers the water 1 in the water storage unit 2b to the nozzle 12. It suffices that the pressure drive unit 11 be able to transfer the water 1. For example, the pressure drive unit 11 is a non-positive displacement pump or a positive displacement pump, and is not particularly limited.

The nozzle 12 is placed directly above the first electrode 3. The nozzle 12 supplies the humidification 1 transferred from the pressure drive unit 11, to an upper part of the first electrode 3 by dripping. That is, in Embodiment 5, the water 1 is not directly supplied from the water storage unit 2b storing the water 1 from a lower part of the first electrode 3 but is supplied from above the first electrode 3 via the nozzle 12. The nozzle 12 is hollow, and its outer shape and inner diameter may be selected in accordance with the size of the first electrode 3. The tip of the nozzle 12 may have any shape such as a triangular pyramid shape, a circular tube shape, or a square tube shape. The material of the nozzle 12 may be, but not limited to, metal such as stainless steel, tungsten, titanium, silver, or copper, or resin such as Teflon (registered trademark), polyethylene, or polypropylene.

The drain pan 13 is placed below the first electrode 3, and receives the water 1 that leaks out from the first electrode 3. The shape and material of the drain pan 13 may be selected as appropriate. The water 1 stored in the drain pan 13 may be circulated to the water storage unit 2b.

(Operation of Humidifier)

Next, operation of the humidifier according to Embodiment 5 will be described with reference to FIG. 10. First, the pressure drive unit 11 transfers the water 1 to the nozzle 12 from the water storage unit 2b in which the water 1 such as tap water is stored. As the nozzle 12 to which the water 1 is transferred drops the water 1 toward an upper part of the first electrode 3 from above the first electrode 3, the water 1 is supplied to the first electrode 3. Since the first electrode 3 has capillary force, and also the gravity of the water 1 can be utilized, the water 1 is uniformly diffused across the entire first electrode 3 at a diffusion rate higher than that in Embodiment 1, through the voids 9 of the first electrode 3, and a predetermined amount of the water 1 is retained by the first electrode 3. At this time, when the power supply 5 applies voltage to the second electrode 4 that is provided opposite to the first electrode 3 at a predetermined distance therefrom, an electric field is formed between the first electrode 3 that is a ground electrode and the second electrode 4, causing electric charges to move to the vicinity of the surface of the first electrode 3. The electric charges that have moved cause the water 1 existing in the voids 9 of the first electrode 3 to be inductively charged, and the Coulomb force exerted by the electric field causes the inductively charged water 1 to form a Taylor cone having a triangular pyramid shape in a direction toward the second electrode 4. The equilibrium between the Coulomb force received by the inductively charged water 1 from the electric field and the surface tension causes this Taylor cone to keep its triangular pyramid shape.

At this time, the power supply 5 forms such an electric field that does not cause an electrical discharge phenomenon to occur between the first electrode 3 and the second electrode 4. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4 by the power supply 5, and the Coulomb force overcomes the surface tension of the water 1 forming the Taylor cone, the Taylor cone drawn from the first electrode 3 is released into the space in the form of mist, causing the Taylor cone to break up into fine droplets of several tens [nm] in size through Rayleigh fission. However, in Embodiment 5, by controlling the strength of the electric field between the first electrode 3 and the second electrode 4 by the power supply 5 so that an electrical discharge phenomenon does not occur, the water 1 on the surface of the first electrode 3 is kept in the Taylor cone state.

As air is sent from the fan 6 provided upstream or downstream of the humidifying unit including the first electrode 3 and the second electrode 4, the water 1 on the surface layer of the first electrode 3, and the Taylor cone drawn from the first electrode 3 by the electric field evaporate and disperse upon gas-liquid contact with the gas to be treated 7 that is the air sent by the fan 6, thereby humidifying the space to be humidified. The direction in which the gas to be treated 7 is sent by the fan 6 is preferably perpendicular to the direction of the electric field formed in the space between the first electrode 3 and the second electrode 4. The water 1 that has leaked out from a lower part of the first electrode 3 is received by the drain pan 13. Moreover, by adjusting the strength of the electric field between the first electrode 3 and the second electrode 4 by the power supply control unit 15, the size of the Taylor cone is varied to adjust the contact area with the gas to be treated 7, thereby enabling adjustment of the amount of humidification.

(Humidification Performance of Humidifier)

Figure 11:
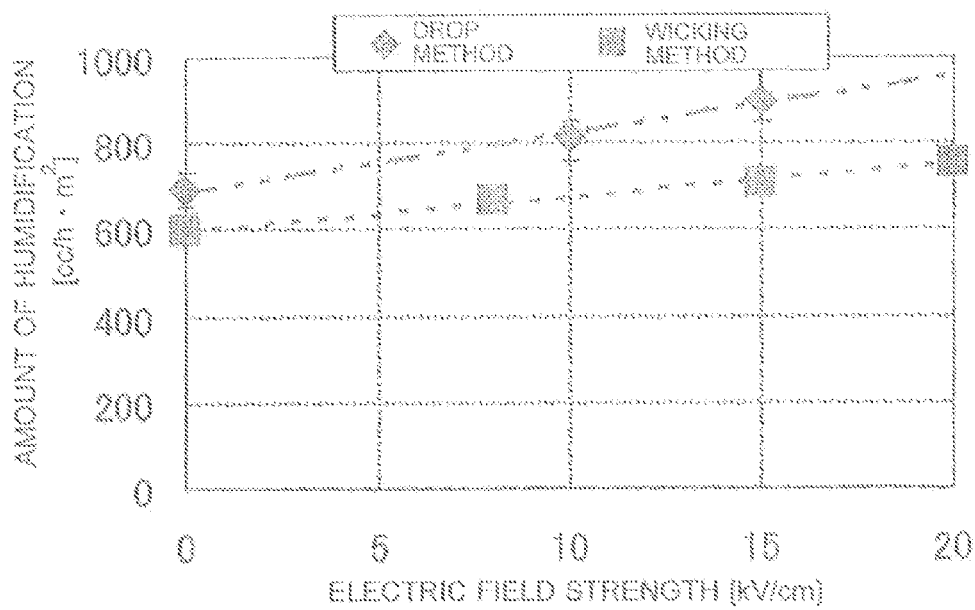
FIG. 11 illustrates the relationship between electric field strength and amount of humidification in the humidifier according to Embodiment 5 of the present invention.

FIG. 11 illustrates the relationship between electric field strength and amount of humidification in the humidifier according to Embodiment 5 of the present invention. The humidifier according to Embodiment 5 performs humidification by forming an electric field between the first electrode 3 and the second electrode 4, and allows the amount of humidification to be controlled by adjusting the strength of the electric field. In this regard, FIG. 11 illustrates a comparison between the drop method according to Embodiment 5, and the wicking method according to Embodiment 2, for the humidification performance with respect to electric field strength in a case where the first electrode 3 containing the water 1 to which the water 1 is supplied is grounded, and voltage is applied by the power supply 5 to the second electrode 4 arranged opposite to the first electrode 3. FIG. 11 illustrates a case where air is sent at 1 [m/s] by the fan 6 to the space between the first electrode 3 and the second electrode 4, and the humidification performance is represented as the amount of humidification per unit area of the first electrode 3 and per unit time. As is apparent from FIG. 11, at the same electrical field strength, the drop method according to Embodiment 5 can provide higher humidification performance than the wicking method according to Embodiment 2. Moreover, as the electric field strength increases, the amount of humidification per unit area and per unit time improves. Thus, humidification performance can be controlled by adjusting the electric field strength, which makes it possible to control the amount of humidification required for the space to be humidified, irrespective of the outside air environment.

(Advantageous Effects of Embodiment 5)

As in the configuration described above, by adopting a drop method whereby the water 1 is supplied by dripping the water 1 to an upper part of the first electrode 3 from the nozzle 12, the gravity of the water 1 can be utilized, and thus the diffusion rate in the first electrode 3 can be improved. Moreover, as a result of this, it is possible to attain a humidification performance higher than that can be attained by the wicking method at the same electric field strength.

By adjusting the electric field strength, the humidification performance can be controlled. Therefore, the amount of humidification required for the space to be humidified can be controlled irrespective of the outside air environment.

While in Embodiment 5 the water supply unit 2*a* drops the water 1 stored in the water storage unit 2*b* toward an upper part of the first electrode 3 by using the pressure drive unit 11 and the nozzle 12, this should not be construed restrictively. Any configuration may be employed as long as the water 1 can be supplied from above the first electrode 3 by dripping or the like.

While in Embodiment 5 the water 1 is supplied in such a way that the water 1 is dripped toward an upper part of the first electrode 3, this should not be construed restrictively. For example, the water 1 may be supplied by flowing the water 1 down to an upper part of the first electrode 3, or may be supplied in any other manner similar to this.

Figure 12:
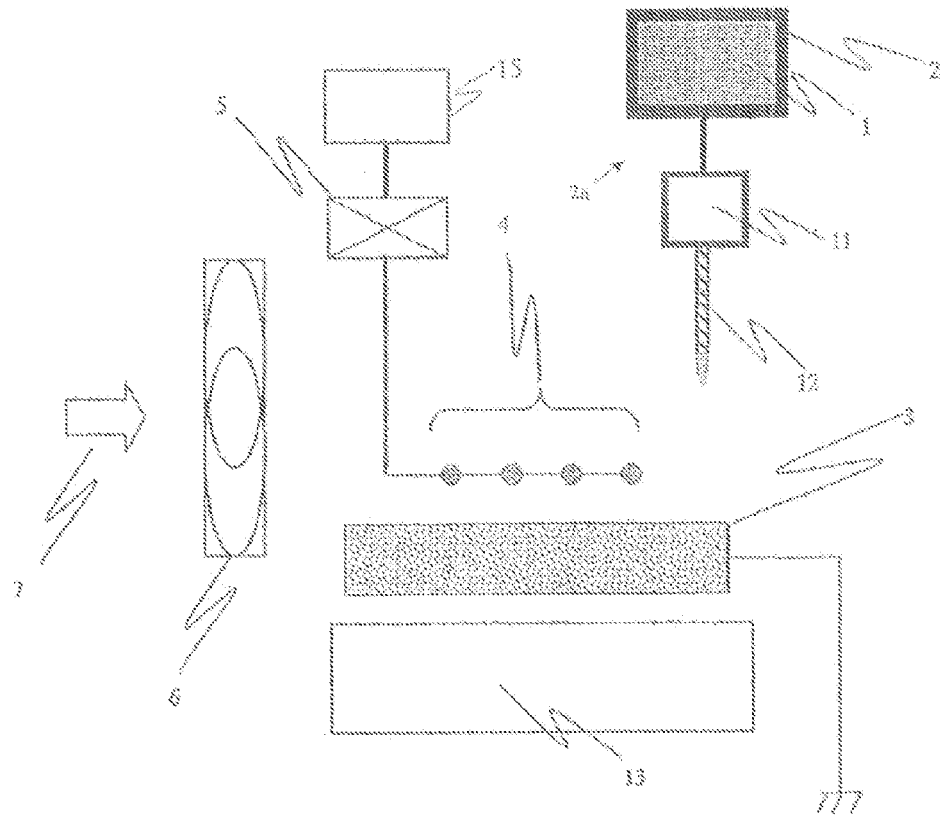
FIG. 12 is an example of schematic diagram of the humidifier according to Embodiment 5 of the present invention.

Further, while FIG. 11 illustrates a case where the opposing surfaces of the first electrode 3 and second electrode 4 are formed in the vertical direction by way of example, the opposing surfaces of the first electrode 3 and second electrode 4 may be formed in a direction perpendicular to the direction of gravity as illustrated in FIG. 12. While FIG. 12 illustrates where the first electrode 3 is located on the upper side and the second electrode 4 is located on the lower side by way of example, the first electrode 3 may be located on the lower side and the second electrode 4 may be located on the upper side.

Embodiment 6.

Figure 13:
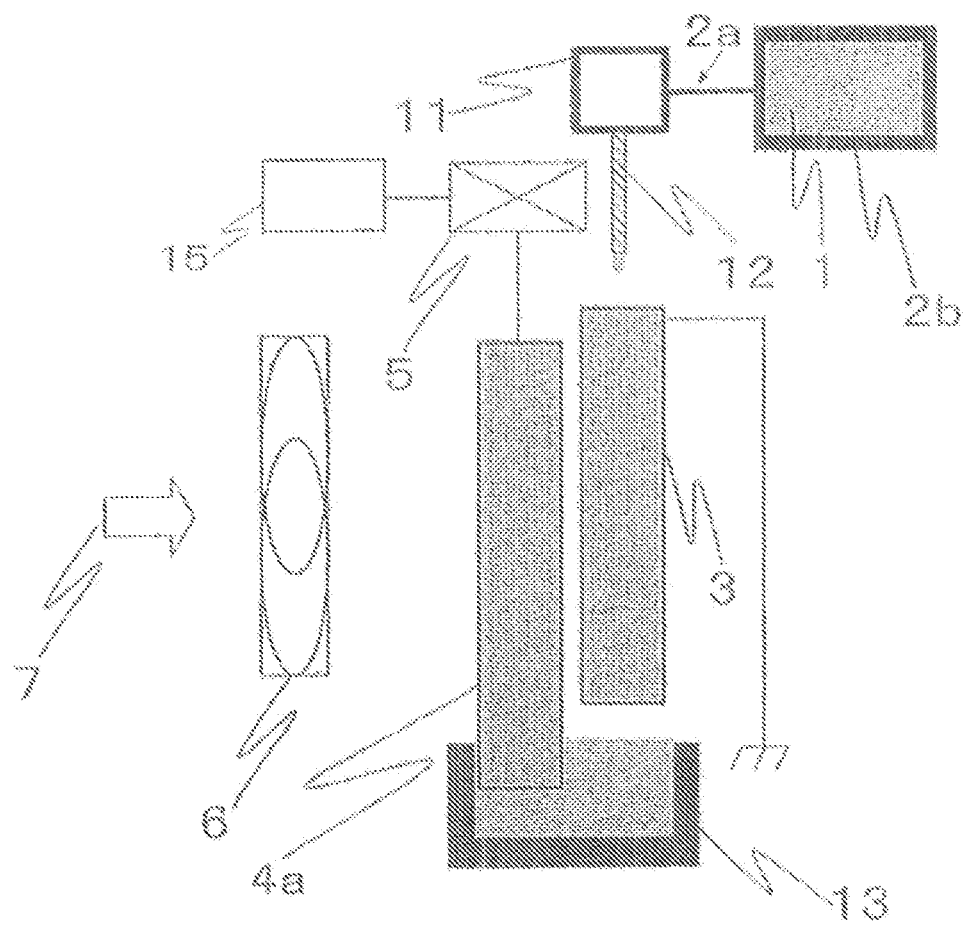
FIG. 13 is a schematic diagram of a humidifier according to Embodiment 6 of the present invention.

FIG. 13 is a schematic diagram illustrating Embodiment 6 of a humidifier according to the present invention. The humidifier will be described with reference to FIG. 13. The portions of the humidifier in FIG. 13 which are configured in the same manner as in the humidifiers in FIG. 9 and FIG. 10 are denoted by the same reference numerals and a description thereof is omitted. The humidifier in FIG. 13 differs from the humidifiers in FIG. 9 and FIG. 10 in the configuration of the water supply unit.

(Configuration of Humidifier)

As illustrated in FIG. 13, the water supply unit includes the drain pan 13 in addition to the upper water supply unit 2*a*. The second electrode 4*a* is arranged vertically inside the drain pan 13 that receives the water 1 leaking out from the first electrode 3, in such a way that the second electrode 4*a* is opposite to the first electrode 3. The water 1 is supplied by using the water stored in the drain pan 13. While the material and structure of the second electrode 4*a* are desirably similar to the first electrode 3, it suffices as long as the second electrode 4*a* has the same function as the first electrode 3. The second electrode 4*a* is connected with the power supply 5, and voltage is applied to the second electrode 4*a*. That is, because a Taylor cone is formed in both of the first electrode 3 and the second electrode 4*a* serving as electrodes, the humidification performance of the humidifier can be improved. While FIG. 13 illustrates a case where the first electrode 3 is grounded and the second electrode 4*a* is connected to the power supply 5 by way of example, because both of the first electrode 3 and the second electrode 4*a* contains water in FIG. 13, the first electrode 3 may be connected to the power supply 5 and the second electrode 4*a* may be grounded.

(Operation of Humidifier)

Next, operation of the humidifier according to Embodiment 6 will be described with reference to FIG. 13.

First, the pressure drive unit 11 transfers the water 1 to the nozzle 12 from the water storage unit 2*b* in which the water 1 such as tap water is stored. As the nozzle 12 to which the water 1 is transferred drops the water 1 toward an upper part of the first electrode 3 from above the first electrode 3, the water 1 is supplied to the first electrode 3. Since the first electrode 3 has capillary force, and also the gravity of the water 1 can be utilized, the water 1 is uniformly diffused across the entire first electrode 3 at a diffusion rate higher than that in Embodiment 1, through the voids 9 of the first electrode 3, and a predetermined amount of the water 1 is retained by the first electrode 3. The water 1 that has leaked out from a lower part of the first electrode 3 is stored by the drain pan 13, and the water 1 is supplied to the second electrode 4*a* from the drain pan 13. Since the second electrode 4*a* has capillary force like the first electrode 3, the water 1 is uniformly diffused across the entire second electrode 4*a* through the voids 9 of the second electrode 4*a*, and a predetermined amount of the water 1 is also retained by the second electrode 4*a*. At this time, when the power supply 5 applies voltage to the second electrode 4*a* that is provided opposite to the first electrode 3 at a predetermined distance, an electric field is formed between the first electrode 3 that is a ground electrode and the second electrode 4*a*, causing electric charges to move to the vicinity of the surfaces of the first electrode 3 and second electrode 4*a*. The electric charges that have moved cause the water 1 existing in the voids 9 of the first electrode 3 and second electrode 4*a* to be inductively charged, and the Coulomb force exerted by the electric field causes the inductively charged water 1 to form a Taylor cone having a triangular pyramid shape. The equilibrium between the Coulomb force received from the inductively charged electric field and the surface tension causes this Taylor cone to keep its triangular pyramid shape.

At this time, the power supply 5 forms such an electric field that does not cause an electrical discharge phenomenon to occur between the first electrode 3 and the second electrode 4. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4a by the power supply 5, and the Coulomb force overcomes the surface tension of the water 1 forming the Taylor cone, the Taylor cone drawn from the first electrode 3 and the second electrode 4a is released into the space in the form of mist, causing the Taylor cone to break up into fine droplets of several tens [nm] in size through Rayleigh fission. However, in Embodiment 6, by controlling the strength of the electric field between the first electrode 3 and the second electrode 4a by the power supply 5 so that an electrical discharge phenomenon does not occur, the water 1 on the surfaces of the first electrode 3 and second electrode 4a is kept in the Taylor cone state.

As air is sent from the fan 6 provided upstream or downstream of the humidifying unit including the first electrode 3 and the second electrode 4a, the water 1 on the surface layers of the first electrode 3 and second electrode 4a, and the Taylor cone drawn from the first electrode 3 and the second electrode 4a by the electric field evaporate and disperse upon gas-liquid contact with the gas to be treated 7 that is the air sent by the fan 6, thereby humidifying the space to be humidified. The direction in which the gas to be treated 7 is sent by the fan 6 is preferably perpendicular to the direction of the electric field formed in the space between the first electrode 3 and the second electrode 4*a*. Since the Taylor cone is formed from both of the first electrode 3 and the second electrode 4*a* in this case, the contact area with the gas to be treated 7 further increases, thereby enabling further improvement of humidification performance. Moreover, by adjusting the strength of the electric field between the first electrode 3 and the second electrode 4*a* by the power supply control unit 15, the size of the Taylor cone is varied to adjust the contact area with the gas to be treated 7, thereby enabling adjustment of humidification performance.

Advantageous Effects of Embodiment 6)

As in the configuration described above, both of the first electrode 3 and the second electrode 4*a* serving as electrodes are supplied with water from the upper water supply unit 2*a* and the drain pan 13, respectively, and the Taylor cone is formed in both of the first electrode 3 and the second electrode 4*a* by the electric field formed by the power supply 5. Therefore, the contract area with the gas to be treated 7 further increases, thereby enabling further improvement of humidification performance.

Embodiment 7.

FIG. 14 is a schematic diagram illustrating Embodiment 7 of a humidifier according to the present invention. The humidifier according to Embodiment 7 will be described with reference to FIG. 14. The portions of the humidifier in FIG. 14 which are configured in the same manner as in the humidifier in FIG. 13 are denoted by the same reference numerals and a description thereof is omitted. The humidifier in FIG. 14 differs from the humidifier in FIG. 13 in the configuration of the water supply unit.

(Configuration of Humidifier)

As illustrated in FIG. 14, in the humidifier according to Embodiment 7, in addition to the configuration of the humidifier according to Embodiment 6 in FIG. 13, a water supply unit 22*a* also supplies the water 1 to the second electrode 4*a* from above, and includes a pressure drive unit 11*a* and a nozzle 12*a*. The water storage unit 2*b* stores the water 1, and feeds the water 1 to the pressure drive unit 11 and the pressure drive unit 11*a*.

The pressure drive unit 11*a* transfers the water 1 in the water storage unit 2*b* to the nozzle 12*a*. It suffices that the pressure drive unit 11*a* be able to transfer the humidification 1. For example, the pressure drive unit 11*a* is a non-positive displacement pump or a positive displacement pump, and is not particularly limited.

The nozzle 12*a* is placed directly above the second electrode 4*a*. The nozzle 12*a* supplies the water 1 transferred from the pressure drive unit 11*a*, to an upper part of the second electrode 4*a* by dropping. The nozzle 12*a* is hollow, and its outer shape and inner diameter may be selected in accordance with the size of the second electrode 4*a*. The tip of the nozzle 12*a* may have any shape such as a triangular pyramid shape, a circular tube shape, or a square tube shape. The material of the nozzle 12*a* may be, but not limited to, metal such as stainless steel, tungsten, titanium, silver, or copper, or resin such as Teflon (registered trademark), polyethylene, or polypropylene.

The drain pan 13 is placed below the first electrode 3 and the second electrode 4*a*, and receives the water 1 that leaks out from the first electrode 3 and the second electrode 4*a*. The shape and material of the drain pan 13 may be selected as appropriate. The water 1 stored in the drain pan 13 may be circulated to the water storage unit 2*b*.

While the drain pan 13 is configured to receive the water 1 that has leaked out from both of the first electrode 3 and a porous metal body 3*b*, this should not be construed restrictively. A drain pan may be provided separately for each of these components.

(Operation of Humidifier)

Next, operation of the humidifier according to Embodiment 7 will be described with reference to FIG. 14. First, the pressure drive unit 11 and the pressure drive unit 11*a* transfer the water 1 to the nozzle 12 and the nozzle 12*a*, respectively, from the water storage unit 2*b* in which the water 1 such as tap water is stored. As the nozzle 12 to which the water 1 is transferred drips the water 1 toward an upper part of the first electrode 3 from above the first electrode 3, the water 1 is supplied to the first electrode 3. Likewise, as the nozzle 12*a* to which the water 1 is transferred drops the water 1 toward an upper part of the second electrode 4*a* from above the second electrode 4*a*, the water 1 is supplied to the second electrode 4*a*. Since the first electrode 3 and the second electrode 4*a* have capillary force, and also the gravity of the water 1 can be utilized, the water 1 is uniformly diffused across each of the entire first electrode 3 and the entire second electrode 4*a* at a diffusion rate higher than that in Embodiment 1, through the voids 9 of the first electrode 3 and second electrode 4*a*, and a predetermined amount of the water 1 is retained by each of the first electrode 3 and the second electrode 4*a*. At this time, when the power supply 5 applies voltage to the second electrode 4*a* that is provided opposite to the first electrode 3 at a predetermined distance, an electric field is formed between the first electrode 3 that is grounded to earth and the second electrode 4*a*, causing electric charges to move to the vicinity of the surfaces of the first electrode 3 and second electrode 4*a*. The electric charges that have moved cause the water 1 existing in the voids 9 of the first electrode 3 and second electrode 4*a* to be inductively charged, and the Coulomb force exerted by the electric field causes the inductively charged water 1 to form a Taylor cone having a triangular pyramid shape. The equilibrium between the Coulomb force that is inductively charged but received from the electric field and the surface tension causes this Taylor cone to keep its triangular pyramid shape.

At this time, the power supply 5 forms such an electric field that does not cause an electrical discharge phenomenon to occur between the first electrode 3 and the second electrode 4. Therefore, the water 1 on the surface of the first electrode 3 keeps its Taylor cone state, without overcoming the surface tension and undergoing fission/scattering (Rayleigh fission). That is, when the electric field strength is increased by increasing the value of an input voltage applied to the second electrode 4a by the power supply 5, and the Coulomb force overcomes the surface tension of the water 1 forming the Taylor cone, the Taylor cone drawn from the first electrode 3 and the second electrode 4a is released into the space in the form of mist, causing the Taylor cone to break up into fine droplets of several tens [nm] in size through Rayleigh fission. However, in Embodiment 7, by controlling the strength of the electric field between the first electrode 3 and the second electrode 4a by the power supply 5 so that an electrical discharge phenomenon does not occur, the water 1 on the surfaces of the first electrode 3 and second electrode 4a is kept in the Taylor cone state.

As air is sent from the fan 6 provided upstream or downstream of the humidifying unit including the first electrode 3 and the second electrode 4a, the Taylor cone that is on the surface layers of the first electrode 3 and second electrode 4a, and drawn from the first electrode 3 and the second electrode 4a by the electric field evaporates and disperses upon gas-liquid contact with the gas to be treated 7 that is the air sent by the fan 6, thereby humidifying the space to be humidified. The direction in which the gas to be treated 7 is sent by the fan 6 is preferably perpendicular to the direction of the electric field formed in the space between the first electrode 3 and the second electrode 4a. Since the Taylor cone is formed from both of the first electrode 3 and the second electrode 4a in this case, the contact area with the gas to be treated 7 further increases, thereby enabling further improvement of humidification performance. Moreover, by adjusting the strength of the electric field between the first electrode 3 and the second electrode 4a by the power supply 15, the size of the Taylor cone is varied to adjust the contact area with the gas to be treated 7, thereby enabling adjustment of humidification performance.

(Advantageous Effects of Embodiment 7)

As in the configuration described above, both of the first electrode 3 and the second electrode 4a serving as electrodes are each supplied with water from the water supply unit 22a, and the Taylor cone is formed in both of the first electrode 3 and the second electrode 4a by the electric field formed by the power supply 5. Therefore, the contract area with the gas to be treated 7 further increases, thereby enabling further improvement of humidification performance.

By adopting a drop method whereby the water 1 is supplied by dropping the water 1 to upper parts of the first electrode 3 and second electrode 4a from the nozzle 12 and the nozzle 12a, respectively, the gravity of the water 1 can be utilized, and thus the diffusion rate in each of the first electrode 3 and the second electrode 4a can be improved. Moreover, as a result of this, it is possible to attain a humidification performance higher than that can be attained by the wicking method at the same electric field strength.

Embodiment 8.

Figure 15:
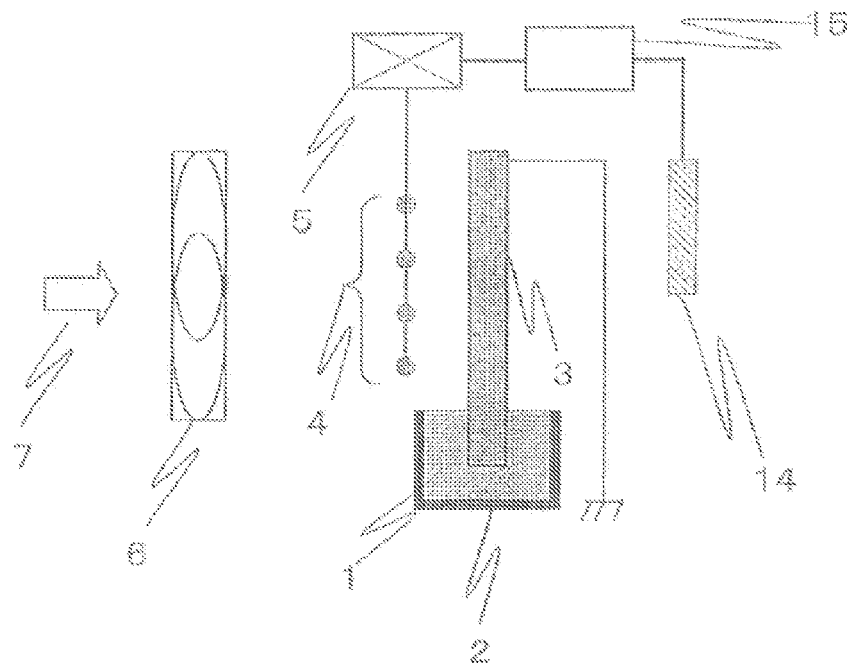
FIG. 15 is a schematic diagram of a humidifier according to Embodiment 8 of the present invention.

FIG. 15 is a schematic diagram illustrating Embodiment 8 of a humidifier according to the present invention. The humidifier according to Embodiment 8 will be described with reference to FIG. 15. The portions of the humidifier in FIG. 15 which are configured in the same manner as in the humidifier in FIG. 1 are denoted by the same reference numerals and a description thereof is omitted. The humidifier in FIG. 15 differs from the humidifier in FIG. 1 in that the humidifier has humidity and temperature detecting means.

(Configuration of Humidifier)

Figure 17:
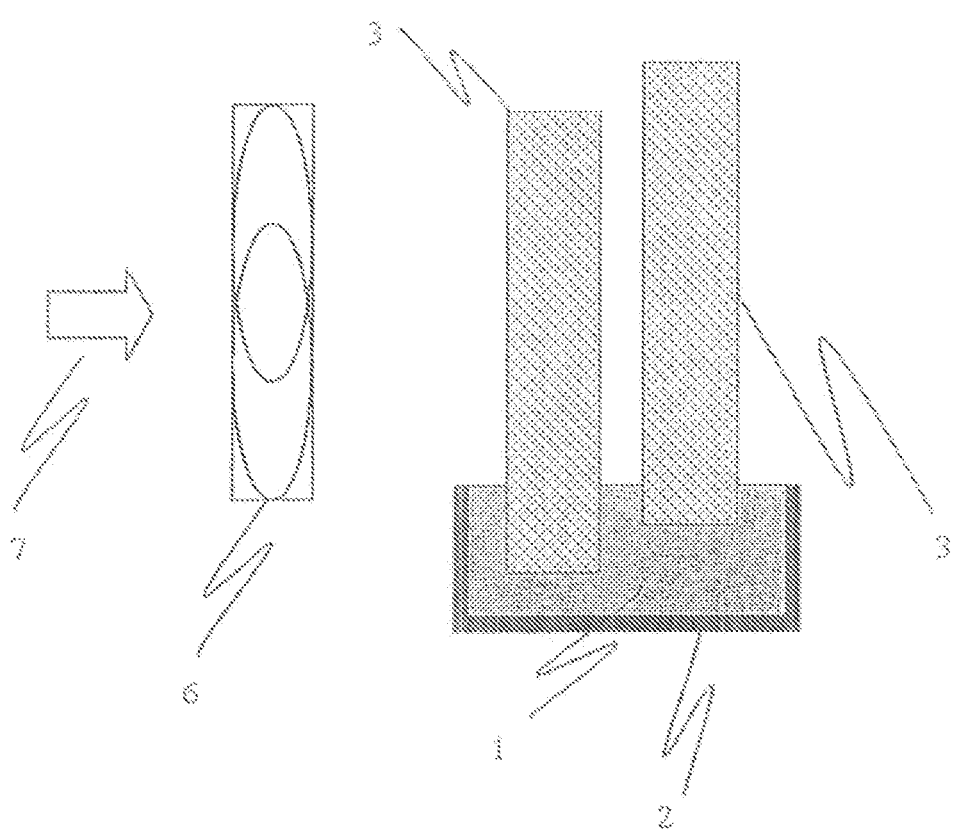
FIG. 17 is a schematic diagram illustrating an embodiment of a humidifier that does not use an electric field according to the present invention.

As illustrated in FIG. 17, the humidifier according to Embodiment 8 includes a temperature and humidity sensor 14. The temperature and humidity sensor 14 is arranged on the downstream side of the direction of air flow from the fan 6 with respect to the first electrode 3 and the second electrode 4, and detects relative humidity and temperature. The temperature and humidity sensor 14 transmits the detected humidity information and temperature information to the power supply control unit 15.

The power supply control unit 15 computes absolute humidity on the basis of the relative humidity information and the temperature information received from the temperature and humidity sensor 14, and controls the voltage applied to the second electrode 4 by the power supply 5, on the basis of the absolute humidity. The power supply 5 adjusts the voltage applied to the second electrode 4, on the basis of a control signal from the power supply control unit 15.

The temperature and humidity sensor 14 may not be of an integral type but may be configured by a temperature sensor and a humidity sensor, each of which is connected to the power supply control unit 15. The temperature and humidity sensor 14 may be a sensor that does not detect relative humidity and temperature but directly detects absolute temperature. In this case, the power supply control unit 15 does not need to compute absolute temperature, thereby enabling a reduction in computational load.

(Advantageous Effects of Embodiment 8)

As in the humidifier according to Embodiment 8, the voltage applied to the second electrode 4 by the power supply 5 is controlled on the basis of the absolute humidity of the space to be humidified. Therefore, a humidification performance appropriate for the absolute humidity can be exerted. That is, if the space to be humidified is excessively humidified by the humidifier, the temperature of the space to be humidified decreases owing to the heat of vaporization, leading to such problems as an increase in heating load. According to the above-mentioned configuration, the voltage applied to the second electrode 4 by the power supply 5 can be controlled on the basis of the absolute humidity of the space to be humidified, thereby making it possible to exert a humidification performance appropriate for the absolute temperature. Moreover, it is possible to prevent an excessive decrease in the temperature of the space to be humidified owing to the heat of vaporization of the water 1 released into the space to be humidified, thereby preventing an increase in heating load.

The configuration according to Embodiment 8 can be also applied to the humidifiers according to Embodiments 2 to 7. Embodiment 9.

Figure 16:
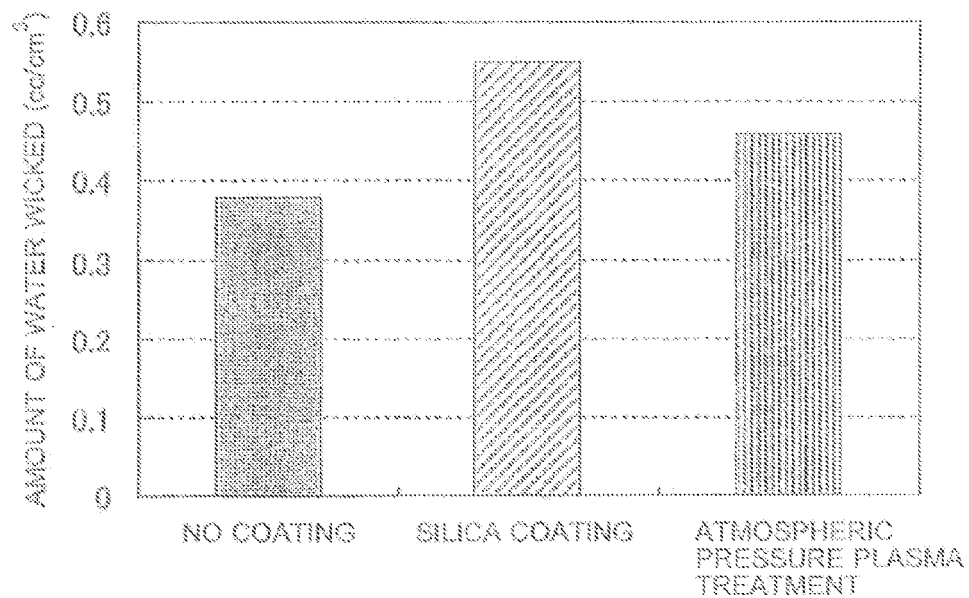
FIG. 16 illustrates a comparison of the amounts of pure water absorbed per unit volume of a first electrode and/or a second electrode of a humidifier according to Embodiment 9 of the present invention.

FIG. 16 is a schematic diagram illustrating Embodiment 9 of a humidifier according to the present invention. The humidifier according to Embodiment 8 will be described with reference to FIG. 16. FIG. 16 illustrates a comparison of the amounts of pure water absorbed per unit volume of the first electrode and/or the second electrode of the humidifier. The first electrode 3 and/or the second electrode 4a subjected to hydrophilic surface treatment described below are applied to the humidifiers in FIGS. 1 to 15.

Embodiment 9 differs from other embodiments in that hydrophilic treatment is applied to the surface layers of the first electrode 3 and second electrode 4a. When preparing the first electrode 3 and the second electrode 4a, the surface after the foam forming process is hydrophobic owing to the absence of hydrophilic groups such as OH groups, which makes it difficult to infiltrate water into the foamed metal. By making the surface of the foamed metal hydrophilic, the infiltration rate of water into the foamed metal improves, and as the amount of retention of water increases, the contact area between the air to be treated and humidifying water increases, thereby increasing humidification performance. Therefore, enhancing the hydrophilic performance of the foamed metal directly contributes to improvement of humidification performance. As specific methods for achieving this, there are a method of coating the surface of the foamed metal with a hydrophilic material, and a method of performing hydrophilic treatment by atmospheric pressure plasma discharge.
(Hydrophilic Treatment Method)

The specific method of applying a coating of hydrophilic material is as follows. A porous metal body was oxidized in atmosphere under the condition of 400° C. for 30 minutes, and after applying phosphate-chromate treatment to the surface for the purpose of improving corrosion resistance, the resulting porous metal body was immersed in 100 mg/L of aqueous solution of sodium silicate for 10 minutes, followed by drying under the condition of 80° C. for five hours, forming a coating film of silica on the surface.

The film thickness of the coating is preferably within a range of 0.01 to 10 μm. Making the film too thick is not preferable because the pores of the foamed portion are blocked. Conversely, making the film too thin is not preferable because the film may peel off over time to decrease the hydrophilicity of the surface, resulting in a decrease in water-containing capacity.

As an alternative to silica as a hydrophilic material, a dimethylformamide solution of silane coupling agent or titanium oxide may be used. Organic polymer resin may be used as well, for example, a dimethylformamide solution of polyvinyl alcohol, polyethylene glycol, cellulose, or epoxy may be used.

Because hydrophilic performance improves as the surface of the foamed metal becomes smoother, a treatment for eliminating surface irregularities may be performed. In this case, it is preferable to stack a film of organic polymer resin. Performing the above-mentioned treatment makes the surface of the porous metal body hydrophilic, which provides the effect of allowing water to be quickly absorbed into the porous metal body.

The method of performing hydrophilic treatment by atmospheric pressure plasma discharge is as follows. After performing degreasing treatment by immersing a metal foam in isopropyl alcohol followed by drying, the metal foam was grounded, and further, a protruding discharge electrode made of stainless steel was placed at a distance of 5 mm from the flat plate of the metal foam, and atmospheric pressure plasma treatment was performed by causing electrical discharge by applying a high voltage therebetween. The applied voltage was an AC voltage of 10 kV at a frequency of 5 kHz, and the treatment time was set to 10 minutes. OH groups form on the surface of the metal foam by the atmospheric pressure plasma discharge, thereby improving hydrophilic performance. An equivalent effect can be attained when the treatment is performed by using corona discharge instead of atmospheric pressure plasma.

The atmospheric pressure plasma treatment may be performed as a pretreatment for the coating treatment. In this case, the adhesion between the coating film and the metal foam is enhanced, thereby improving durability over time.
(Advantageous Effects of Hydrophilic Treatment)

FIG. 16 illustrates a comparison of the amounts of pure water absorbed per unit volume of the first electrode 4 (second electrode 4a) applied with silica coating and atmospheric pressure plasma treatment of the humidifier according to Embodiment 9 of the present invention and porous ceramics. Porous titanium was used as the material of the metal foam.

As is apparent from FIG. 16, it was found that while the amount of water wicked per unit area of porous titanium with no coating is 0.38 [cc/cm$^3$], the amounts of water absorbed per unit area of metal foams applied with silica coating and atmospheric pressure plasma treatment are large at 0.55 [cc/cm$^3$] and 0.46 [cc/cm$^3$], respectively. That is, by applying treatment to the surface of the metal foam, it is possible for the first electrode 3 and/or the second electrode 4a to retain a large amount of the water 1 from the water supply unit 2.

Figure 14:
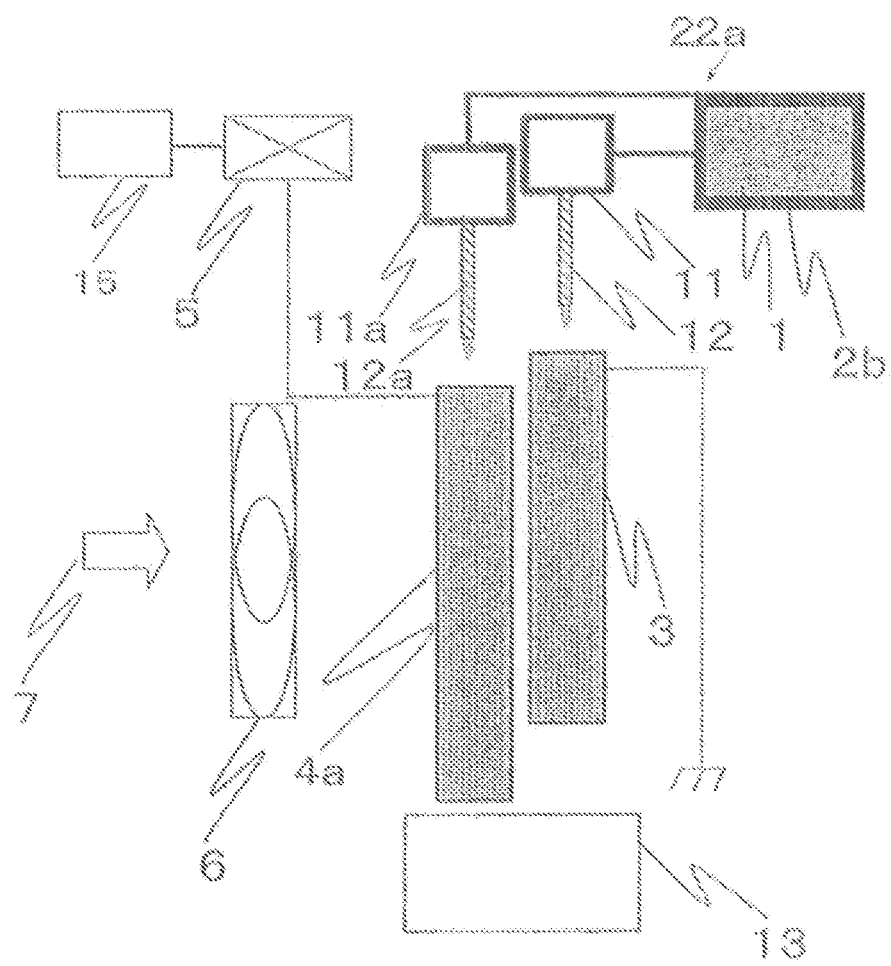
FIG. 14 is a schematic diagram of a humidifier according to Embodiment 7 of the present invention.
Figure 18:
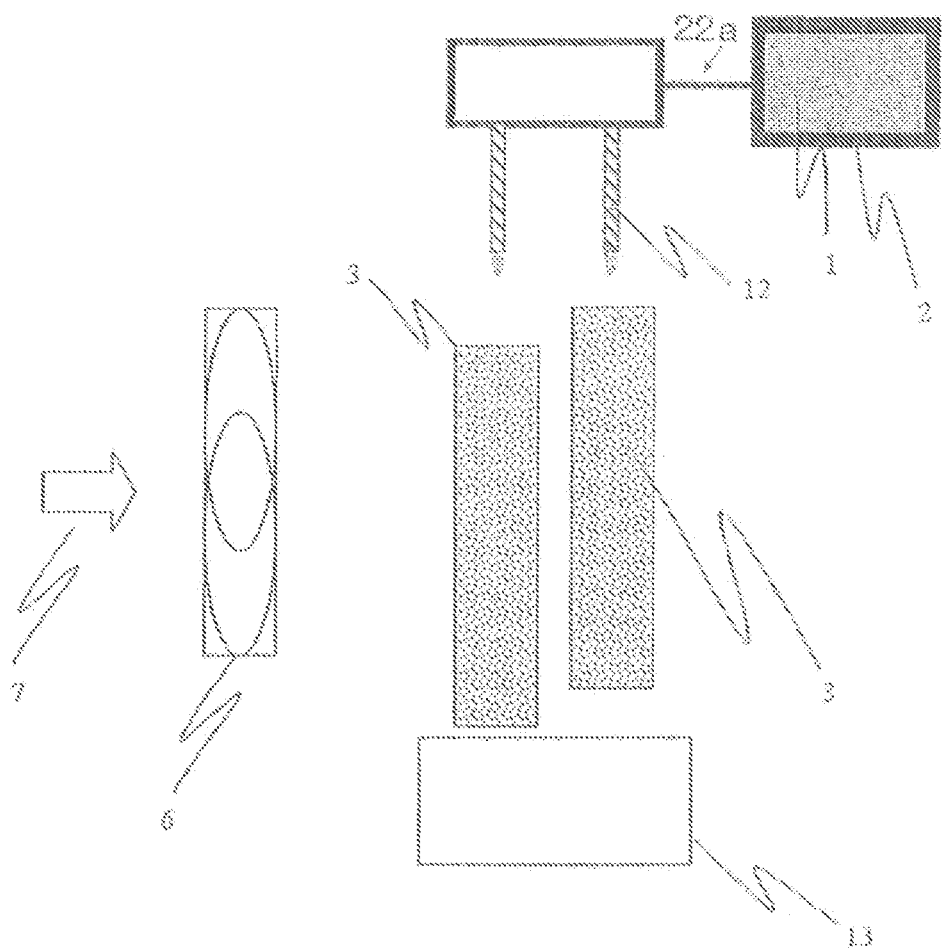
FIG. 18 is a schematic diagram illustrating an embodiment of a humidifier that does not use an electric field according to the present invention.
Figure 19:
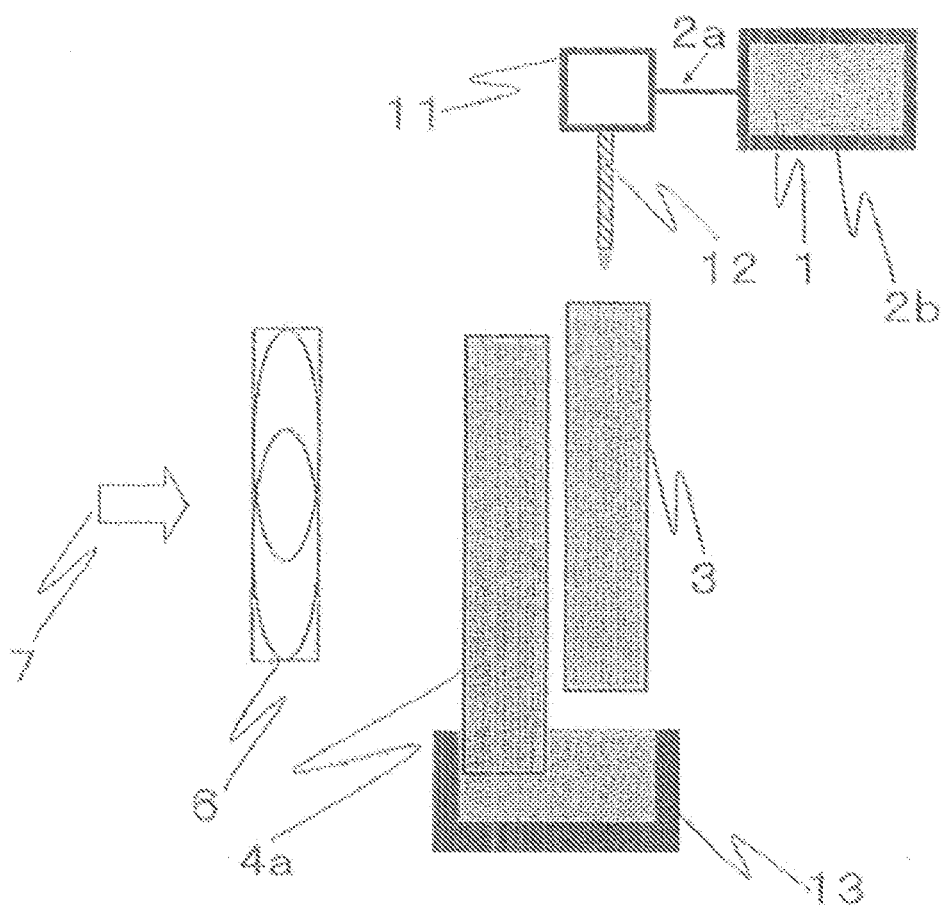
FIG. 19 is a schematic diagram illustrating an embodiment of a humidifier that does not use an electric field according to the present invention.

Embodiments of the present invention are not limited to the embodiments mentioned above. For example, while the above-mentioned embodiments are directed to the case where an electric field is formed between the first electrode 3 and the second electrode 4, as illustrated in FIGS. 17 to 19, the humidifier may be one that does not form an electric field because it is also possible to evaporate and disperse the water 1 from the first electrode 3 (water-containing body) that has absorbed water without forming an electric field. FIGS. 17 to 19 differ from each other in the configuration of the water supply unit. The configuration in FIG. 17 supplies the water 1 to the first electrode 3 (water-containing body) from a lower part as illustrated in FIG. 1 (or FIG. 9), the configuration in FIG. 18 supplies the water 1 to the first electrode 3 (water-containing body) from above as illustrated in FIG. 14, and the configuration in FIG. 19 supplies the water 1 to one first electrode 3 (water-containing body) from above, and supplies the water 1 to the other first electrode 3 (water-containing body) from a lower part.

Conventional evaporative humidifiers perform humidification by using a filter made of non-woven fabric. To improve humidification performance in humidification based on vaporization through the filter, improvement of passing air velocity, passage of high-temperature air, and passage of low-humidity air are required. For this reason, as a factor for improving humidification performance, it is conceivable to select a material with high heat conductivity for the evaporative filter. Accordingly, by using a porous metal for the first electrode 3 (water-containing body) in the humidifiers in FIGS. 17 to 19, heat energy from the outside can be effectively utilized.

Reference Signs List 1 water, 2, 22a water supply unit, 2a upper water supply unit, 2b water storage unit, 3 first electrode (porous metal body, water-containing body), 4 second electrode (conductor electrode), 4a second electrode (porous metal body), 5 power supply, 6 fan, 7 gas to be treated, 8 metal part, 9 voids, 10 insulating member, 11, 11a pressure drive unit, 12, 12a nozzle, 13 drain pan, 14 temperature and humidity sensor, 15 power supply control unit

The invention claimed is:

1. A humidifier comprising:
a first electrode that is a porous metal body formed in a flat shape and having a three-dimensional porous structure;
a second electrode that is a conductor electrode formed in a flat shape and arranged opposite to the first electrode with a space of a predetermined distance from the first electrode so that planes of the first and second electrodes are parallel to each other;
a power supply that forms an electric field in the space between the first electrode and the second electrode;
a water supply unit that supplies water to the first electrode;
a fan that sends air in a direction perpendicular to a direction in which the electric field is formed, to the space to evaporate and disperse the water that is supplied from the water supply unit to the first electrode and retained by the first electrode, and a power supply control unit that adjusts a strength of the electric field between the first electrode and the second electrode formed by the power supply.

2. The humidifier of claim 1, wherein the second electrode has an insulating member at an outer peripheral end portion.

3. The humidifier of claim 1, wherein:
the second electrode is formed of a porous metal body; and
the water supply unit has a function of supplying the water to the second electrode.

4. The humidifier of claim 1, wherein:
the water supply unit is provided directly below the first electrode and/or the second electrode, and stores the water inside the water supply unit; and
the first electrode and/or the second electrode are/is arranged so that a lower part is immersed in the water stored in the water supply unit, and the water is supplied from the part immersed in the water.

5. The humidifier of claim 1, wherein the water supply unit supplies the water from above the first electrode and/or the second electrode.

6. The humidifier of claim 1, wherein:
the water supply unit includes
an upper water supply unit that supplies the water to the first electrode from above, and
a drain pan that is arranged below the first electrode and the second electrode,
the drain pan receiving and storing the water that leaks out from the first electrode; and
the second electrode is supplied with the water by immersing its lower part in the water stored in the drain pan.

7. The humidifier of claim 1, further comprising temperature and humidity detecting means arranged at a position on a downstream side of a direction of air flow from the fan with respect to the first electrode and the second electrode, for detecting a temperature and a humidity at the position,
wherein the power supply control unit controls the strength of the electric field between the first electrode and the second electrode formed by the power supply, on a basis of temperature information and humidity information detected by the temperature and humidity detecting means.

8. The humidifier of claim 1, wherein the power supply forms the electric field by applying a voltage having a negative polarity with respect to a voltage on the first electrode, to the second electrode.

9. The humidifier of claim 4, wherein the first electrode is electrically grounded.

10. The humidifier of claim 1, wherein hydrophilic treatment is applied to the porous metal body of the first electrode and/or the second electrode.

11. The humidifier of claim 1, wherein the strength of the electric field formed between the first electrode and the second electrode is not more than 30kV/cm.

12. The humidifier of claim 1, wherein the space between the first and second electrode is not less than 3 mm and not more than 20 mm.

13. The humidifier of claim 1, wherein the porous metal body of the first electrode has a porosity of 60% to 90%.

14. The humidifier of claim 1, wherein a pore diameter of the first electrode is from 50 μm to 600 μm.

* * * * *

UNITED STATES PATENT AND TRADEMARK OFFICE
CERTIFICATE OF CORRECTION

PATENT NO. : 9,228,752 B2  
APPLICATION NO. : 13/982756  
DATED : January 5, 2016  
INVENTOR(S) : Takahiro Sakai et al.

It is certified that error appears in the above-identified patent and that said Letters Patent is hereby corrected as shown below:

On the title page, Item (73), the Assignee's Information is incorrect. Item (73) should read:

--(73) Assignee: Mitsubishi Electric Corporation, Tokyo (JP)--

Signed and Sealed this  
Twelfth Day of April, 2016

Michelle K. Lee  
*Director of the United States Patent and Trademark Office*